United States Patent [19]
Saito et al.

[11] Patent Number: 5,732,071
[45] Date of Patent: Mar. 24, 1998

[54] ATM BRIDGE DEVICE AND ATM BRIDGING SCHEME FOR REALIZING EFFICIENT ATM BRIDGE INTERCONNECTION

[75] Inventors: Takeshi Saito, Bernards Township, N.J.; Hiroshi Esaki, Tackahoe, N.Y.; Shigeo Matsuzawa, Tokyo, Japan

[73] Assignee: Kabushiki Kaisha Toshiba, Kawasaki, Japan

[21] Appl. No.: 366,597

[22] Filed: Dec. 29, 1994

[30] Foreign Application Priority Data

Dec. 29, 1993 [JP] Japan ................. P05-351107

[51] Int. Cl.⁶ ........................................... H04L 12/66
[52] U.S. Cl. .................... 370/255; 370/397; 370/401; 370/409
[58] Field of Search ............................ 370/58.2, 58.3, 370/60, 60.1, 79, 85.13, 58.14, 94.1, 94.2, 54, 254, 255, 395, 397, 401, 409

[56] References Cited

U.S. PATENT DOCUMENTS

| | | | |
|---|---|---|---|
| 4,975,906 | 12/1990 | Takiyasu et al. | 370/85.13 |
| 5,060,228 | 10/1991 | Tsutsui et al. | 370/85.13 |
| 5,280,476 | 1/1994 | Kojima et al. | 370/60.1 |
| 5,329,527 | 7/1994 | Ujihashi et al. | 370/85.13 |
| 5,420,858 | 5/1995 | Marshall et al. | 370/60.1 |

FOREIGN PATENT DOCUMENTS 5-37569  2/1993  Japan .................. H04L 12/66

*Primary Examiner*—Douglas W. Olms
*Assistant Examiner*—Russell W. Blum
*Attorney, Agent, or Firm*—Foley & Lardner

[57] ABSTRACT

A device and a scheme for realizing the bridge interconnection in the ATM network efficiently. In the bridge device, a MAC frame transmitted from the interface with respect to the ATM network is transmitted selectively to either a point-to-point ATM connection interconnecting this bridge device and another bridge device or a multicast ATM connection interconnecting this bridge device and other bridge devices, while MAC addresses and identifiers of point-to-point ATM connections are registered in correspondences in a table. In a case this bridge device directly accommodates emulation hosts for emulating another non-ATM network through ATM connections having this bridge device as a starting point, a type of a MAC frame entered from the interface with respect to the ATM network is identified as either a MAC frame transmitted from any of the emulation hosts or a MAC frame transmitted from another bridge device connected with this bridge device by a bridge connection through the ATM network, and the MAC frame entered from the interface is transmitted selectively to ATM connections of the ATM network according to the identified type.

22 Claims, 18 Drawing Sheets

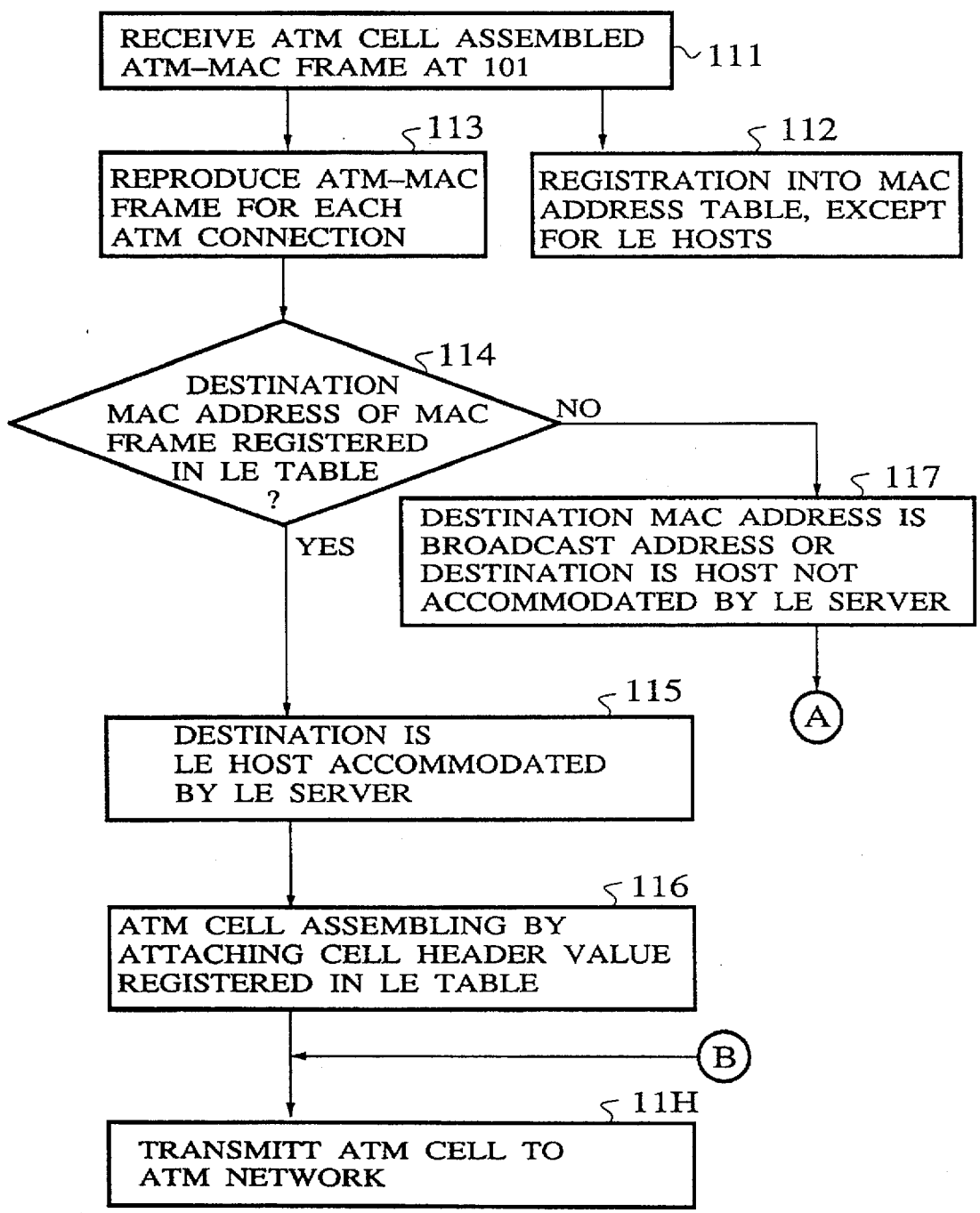

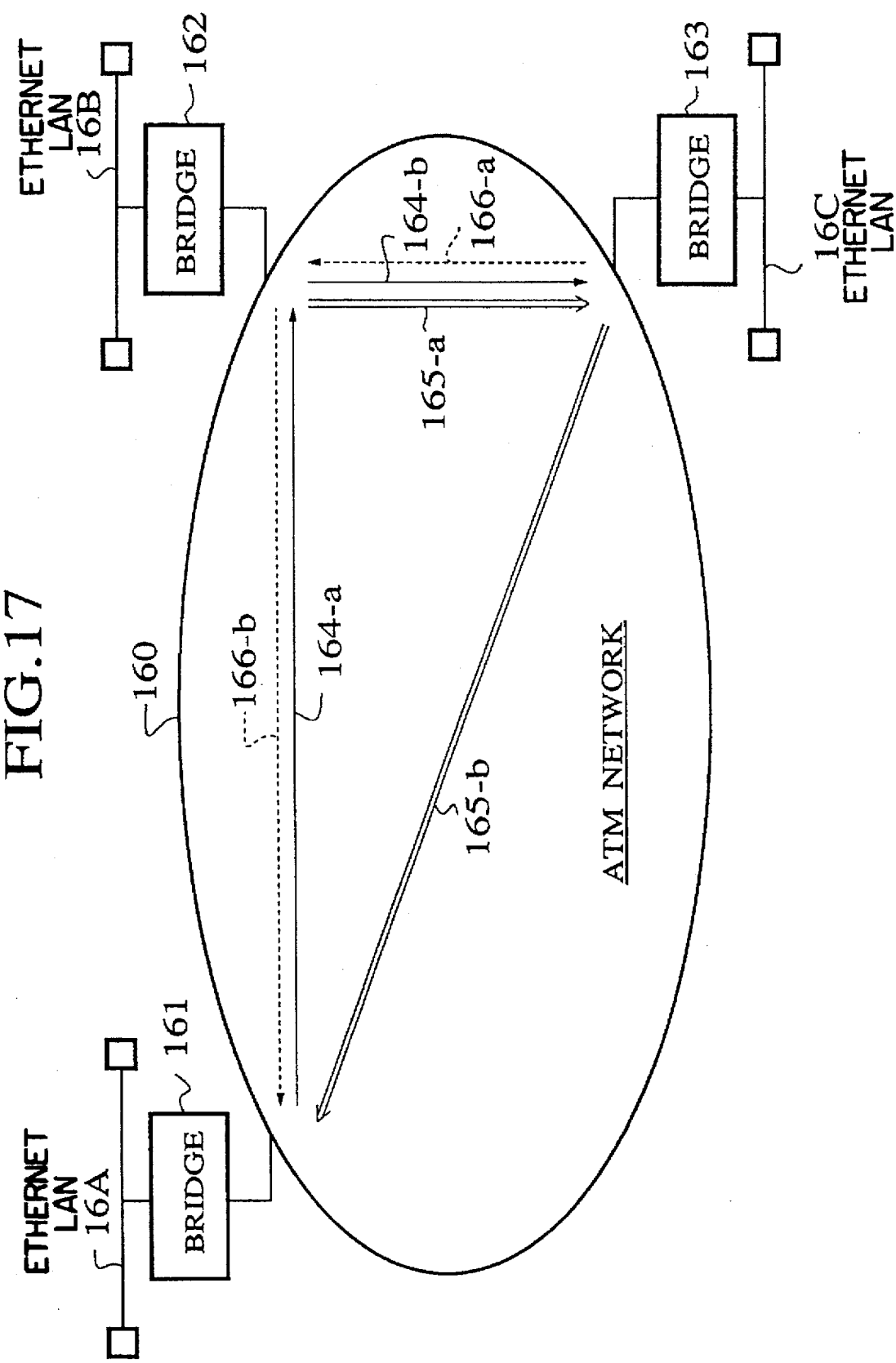

FIG.18

- 171 ETHERNET SIDE PHYSICAL I/F
- 172 MAC ADDRESS REFERRING UNIT
- 173 MAC ADDRESS FILTERING UNIT
- 174 ETHERNET SIDE MAC ADDRESS TABLE
- 175 ATM-MAC FRAME FORMATION UNIT
- 176 ATM-MAC FRAME MULTIPLEXING UNIT
- 177 AAL/ATM LAYER TRANSMISSION PROCESSING UNIT
- 178 ATM NETWORK SIDE PHYSICAL I/F
- 17A AAL/ATM LAYER RECEPTION PROCESSING UNIT
- 17B ATM-MAC SOURCE ADDRESS REFERRING/DISCARDING UNIT
- 17C ATM-MAC DESTINATION ADDRESS ETHERNET SIDE FILTERING UNIT
- 17D MAC FRAME FORMATION UNIT
- 17E CELL HEADER VALUE CORRESPONDENCE TABLE (INPUT CELL HEADER VALUE / OUTPUT CELL HEADER VALUE)

5,732,071

ATM BRIDGE DEVICE AND ATM BRIDGING SCHEME FOR REALIZING EFFICIENT ATM BRIDGE INTERCONNECTION

BACKGROUND OF THE INVENTION

1. Field of the Invention

The present invention relates to a bridge device and a bridging scheme used in an ATM (Asynchronous Transfer Mode) network.

2. Description of the Background Art

In recent years, due to the increasing demands for various types of communication such as an image communication and a high speed data communication, an integration of the communication networks is eagerly awaited for providing efficient and flexible communication services. As a candidate for realizing such an integration of the communication networks, the ATM communication scheme is considered highly prospective and the research and development of the ATM communication scheme has been vigorously pursued in the fields of the WAN (Wide Area Network) and the LAN (Local Area Network).

One prospective manner of utilizing the ATM network is the inter LAN connection. As is well known, the inter LAN connection can be realized in various forms including a repeater interconnection, a bridge Interconnection, and a router interconnection, but the discussion concerning a concrete scheme for realizing this inter LAN connection through the ATM network at the standardization committee such as the ATM forum is still in an early stage.

Now, in the bridge interconnection, as shown in FIG. 1, a bridge device 180 is connected between a first LAN 181 and a second LAN 182 to monitor a destination MAC (Media Access Control) address of each MAC frame transmitting in each LAN, and functions to transmit each MAC frame from one segment (the first LAN 181 for example) to another segment (the second LAN 182 for example) when a host (terminal device) having the destination MAC address is considered to be not present on that one segment side.

In the case of such a conventional bridge device applied to the ATM network, the following problems are expected to arise.

(1) The ATM network is not a so called broadcast network, so that a simple scheme for transmitting the MAC frame with a destination not existing on one segment side to another segment side as in the conventional bridge device is not applicable to the ATM network.

(2) As a possible solution to the above problem (1), there is an idea of constructing pseudo broadcast network by providing a multicast ATM connection taking a certain bridge device as a starting point and all the other bridge devices to be in bridge interconnection with that certain bridge device as ending points. However, the use of the broadcast connection or the multicast connection implies that the MAC frame to be transmitted is going to be spread widely besides the receiver of that MAC frame, and it is going to increase the traffic in the ATM network inadvertently.

(3) It is also possible to consider a case in which the bridge device directly accommodates a LAN emulation host existing in the ATM network. Here, the LAN emulation host is a host which has a function for generating and receiving the MAC frame while it is located within the ATM network, and it is capable of exchanging the data directly by using the MAC frame with a host on the other non-ATM type LAN in a form of a bridge interconnection. There are cases for bridge interconnecting between the bridge device accommodating the LAN emulation host and the other bridge devices. It is not absolutely necessary for this bridge device to have two or more physical ports, and it suffices for this bridge device to have an ATM network physical interface.

In this case, a mechanism for transmitting the entered MAC frame to all the other physical ports when the destination address of the entered MAC frame cannot be found in the entered physical port side as considered in (2) above cannot deal with the ATM network oriented bridge device which has only a single physical port.

In addition, when the ATM network contains a plurality of bridge devices accommodating the LAN emulation hosts and these bridge devices are mutually bridge interconnected, there arises a problem of an indefinite loop in which the broadcast frame or the MAC frame destined to the MAC address which is not yet registered in the bridge devices continues to be transmitted among the bridge devices indefinitely.

(4) As for the broadcast frame mentioned in (3) above, it is possible to consider a scheme for constructing a spanning tree having all the bridge devices which are participating in the bridge interconnection as the starting points, and transmitting the broadcast frame by using the broadcast channel of the spanning tree configuration. However, such a scheme requires as many spanning trees as the number of bridge interconnections participating in the bridge interconnection, and this in turn requires very complicated management, initial setting, and deletion of tables for the spanning trees.

SUMMARY OF THE INVENTION

It is therefore an object of the present invention to provide a bridge device and a bridging scheme capable of realizing the bridge interconnection in the ATM network efficiently.

According to one aspect of the present invention there is provided an ATM bridge device for bridging between a first communication network operated in an ATM scheme and a second communication network operated in a non-ATM scheme, comprising: a first interface for exchanging signals with the first communication network; a second interface for exchanging signals with the second communication network; first transmission means for judging whether a host having a destination address of a MAC frame entered from the second interface exists in the second communication network, transmitting the MAC frame entered from the second interface to the first interface when it is judged that the host having the destination address of the MAC frame entered from the second interface does not exist in the second communication network, and transmitting a MAC frame transmitted from the first interface selectively to one of a point-to-point ATM connection interconnecting said ATM bridge device and another ATM bridge device and a multicast ATM connection interconnecting said ATM bridge device and other ATM bridge devices; second transmission means for transmitting the MAC frame entered from the first interface to the second interface; and table means for storing MAC addresses and identifiers of point-to-point ATM connections in correspondences by registering a source address of each MAC frame entered from the first interface and an identifier of a point-to-point ATM connection corresponding to said each MAC frame.

According to another aspect of the present invention there is provided an ATM bridge device for an ATM communication network, which is directly accommodating emulation hosts for emulating another non-ATM communication network through ATM connections for bridge interconnecting said ATM bridge device and other ATM bridge devices, comprising: an interface for exchanging signals with the ATM communication network and transmission means for identifying a type of a MAC frame entered from the interface as one of a first type MAC frame which is transmitted from any of the emulation hosts and a second type MAC frame which is transmitted from another ATM bridge device which is bridge interconnected with said ATM bridge device through the ATM communication network, and transmitting the MAC frame entered from the interface selectively to ATM connections of the ATM communication network according to the identified type.

According to another aspect of the present invention there is provided a method for bridging between a first communication network operated in an ATM scheme and a second communication network operated in a non-ATM scheme, comprising the steps of: (a) providing a first interface for exchanging signals with the first communication network and a second interface for exchanging signals with the second communication network in an ATM bridge device between the first and second communication networks; (b) judging whether a host having a destination address of a MAC frame entered from the second interface exists in the second communication network, and transmitting the MAC frame entered from the second interface to the first interface when it is judged that the host having the destination address of the MAC frame entered from the second interface does not exist in the second communication network; (c) transmitting a MAC frame transmitted from the first interface selectively to one of a point-to-point ATM connection interconnecting said ATM bridge device and another ATM bridge device and a multicast ATM connection interconnecting said ATM bridge device and other ATM bridge devices; (d) transmitting the MAC frame entered from the first interface to the second interface; and (e) storing MAC addresses and identifiers of point-to-point ATM connections in correspondences in table means by registering a source address of each MAC frame entered from the first interface and an identifier of a point-to-point ATM connection corresponding to said each MAC frame.

According to another aspect of the present invention there is provided a method of bridging for an ATM communication network by an ATM bridge device which is directly accommodating emulation hosts for emulating another non-ATM communication network through ATM connections for bridge interconnecting said ATM bridge device and other ATM bridge devices, comprising the steps of: (a) providing an interface for exchanging signals with the ATM communication network in said ATM bridge device; and (b) identifying a type of a MAC frame entered from the interface as one of a first type MAC frame which is transmitted from any of the emulation hosts and a second type MAC frame which is transmitted from another ATM bridge device which is bridge interconnected with said ATM bridge device through the ATM communication network, and transmitting the MAC frame entered from the interface selectively to ATM connections of the ATM communication network according to the identified type.

Other features and advantages of the present invention will become apparent from the following description taken in conjunction with the accompanying drawings.

BRIEF DESCRIPTION OF THE DRAWINGS

FIG. 12A and FIG. 12B are flow charts for an operation of the LAN emulation server of FIG. 11.

FIG. 17 is a diagram of an ATM communication system for a fourth embodiment of an ATM bridge device and an ATM bridging scheme according to the present invention.

FIG. 18 is a block diagram of an internal configuration of a bridge device in the system of FIG. 17.

DETAILED DESCRIPTION OF THE PREFERRED EMBODIMENTS

Now, the first embodiment of an ATM bridge device and an ATM bridging scheme according to the present invention will be described.

Figure 1:
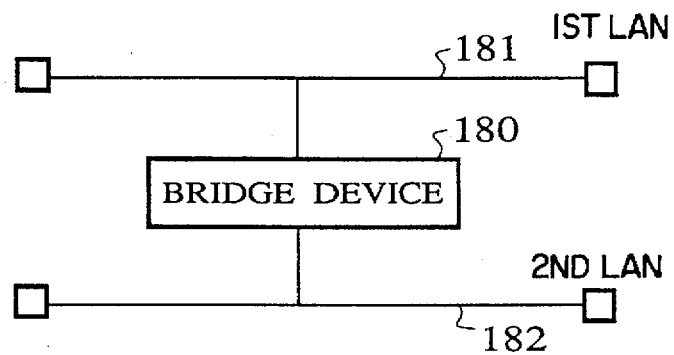
FIG. 1 is a schematic diagram of a conventional bridge interconnection.
Figure 2:
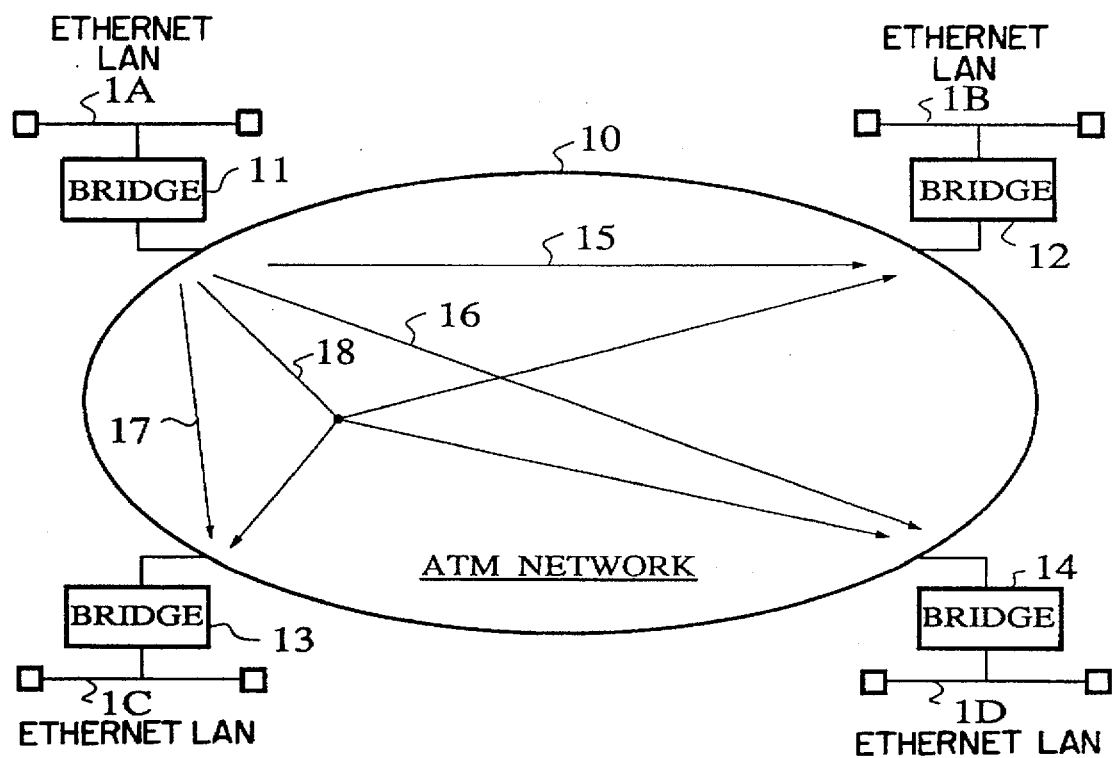
FIG. 2 is a diagram of an ATM communication system for a first embodiment of an ATM bridge device and an ATM bridging scheme according to the present invention.

In this first embodiment, the ATM communication system has an overall configuration as shown in FIG. 2, which comprises an ATM network 10, ethernet LANs 1A, 1B, 1C, and 1D which are non-ATM communication networks, and bridge devices 11, 12, 13, and 14 for making bridge interconnectins between the ATM network 10 and the ethernet LANs 1A, 1B, 1C, and 1D, respectively, so as to construct an ATM bridge interconnection environment.

The ATM network 10 is formed by a number of ATM exchangers (ATM switches or ATM hubs) and a number of hosts (terminal devices). Here, the connections among the ethernets are the bridge interconnections, so that the network layer address (such as the IP address) of the hosts connected with the ethernet LANs 1A to 1D have the same network address (net ID or sub-net ID).

The ATM network 10 establishes point-to-point ATM connections interconnecting each ATM bridge device and another ATM bridge device, and point-to-multipoint (multicast) ATM connection interconnecting each ATM bridge device and other ATM bridge devices. More specifically, the ATM network 10 establishes point-to-point ATM connections having each bridge device as a starting point and each of the other bridge devices as ending points, and point-to-multipoint ATM connections having each bridge device as a starting point and all the other bridge devices as ending points, so that the exchange of the data (MAC frames) among the ethernets which are bridge interconnected can be carried out through these ATM connections. In other words, among the bridge devices 11 to 14, the mesh like point-to-point ATM connections and the multicast ATM connection having each bridge device as a starting point are established in the ATM network 10. In FIG. 2, only a group of ATM connections having the bridge device 11 as a starting point are depicted for the sake of simplicity, i.e., the point-to-point ATM connections 15, 16, and 17, and the multicast ATM connection 18 are shown as examples. The similar groups of ATM connections are also established for the other bridge devices 12 to 14.

Here, the point-to-multipoint ATM connection in the ATM network 10 can be realized by either a centralized scheme for using a multicast server within the ATM network 10 or a distributed scheme for constructing a spanning tree with the exchangers as nodes.

Now, the function of each of the bridge devices 11 to 14 will be described in detail. Here, all of the bridge devices 11 to 14 have similar configuration and function, so that only a case of the bridge device 11 will be described below as a representative case.

Figure 3:
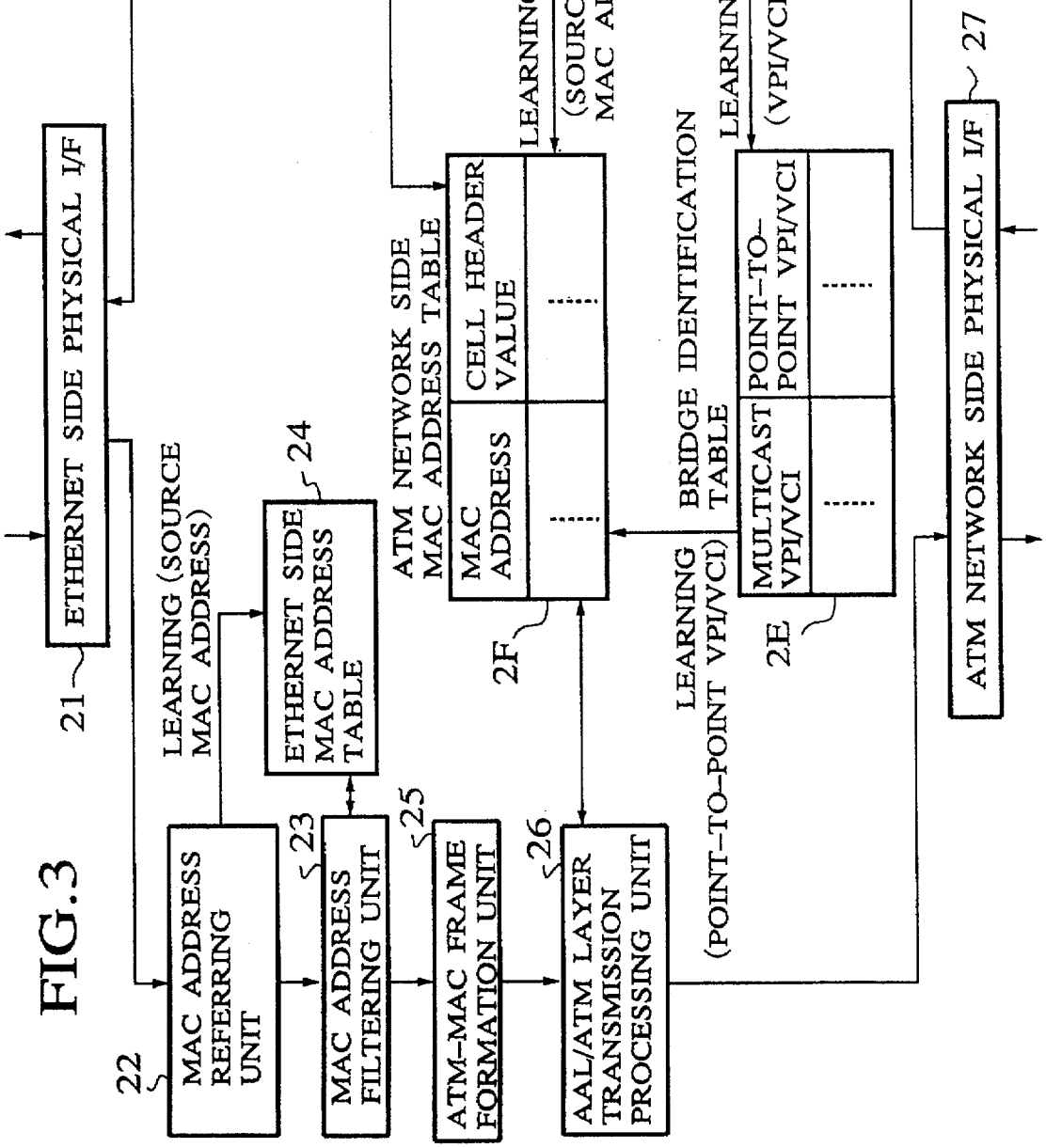
FIG. 3 is a block diagram of an internal configuration of a bridge device in the system of FIG. 2.

In this first embodiment, the bridge device 11 has an internal configuration shown in FIG. 3, which has an ethernet side physical interface unit 21 connected with the ethernet LAN 1A and an ATM network side physical interface unit 27 connected with the ATM network 10. Between them, for handling the data flow from the ethernet side to the ATM network side, there are provided a MAC address referring unit 22, a MAC address filtering unit 23, an ATM-MAC frame formation unit 24, and an AAL/ATM layer transmission processing unit 26, and for handling the data flow from the ATM network side to the ethernet side, there are provided an AAL/ATM layer reception processing unit 2A, an ATM-MAC address referring unit 2B, a MAC address filtering unit 2C, and a MAC frame formation unit 2D. In addition, an ethernet side MAC address table 24 is provided with respect to the MAC address referring unit 22 and the MAC address filtering unit 23, an ATM network side MAC address table 2F is provided with respect to the AAL/ATM layer transmission processing unit 26, the ATM-MAC address referring unit 2B, and the MAC address filtering unit 2C, and a bridge identification table 2E is provided with respect to the AAL/ATM layer reception processing unit 2A and the ATM network side MAC address table 2F. The detailed functions of each of these elements of the bridge device 11 will be explained below.

Figure 4:
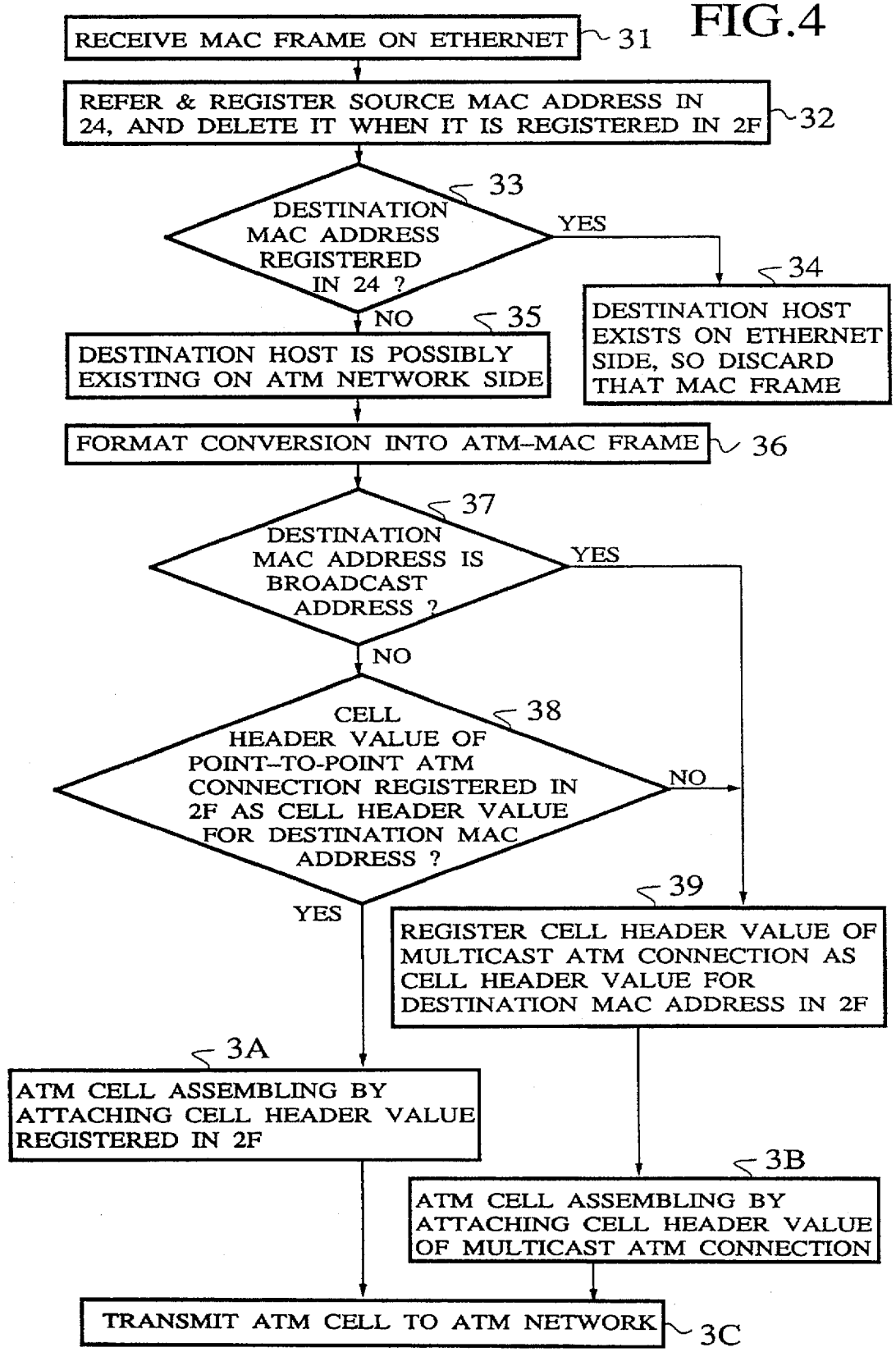
FIG. 4 is a flow chart for an operation of the bridge device of FIG. 3 in a case of the data flow from the ethernet to the ATM network side.
Figure 5:
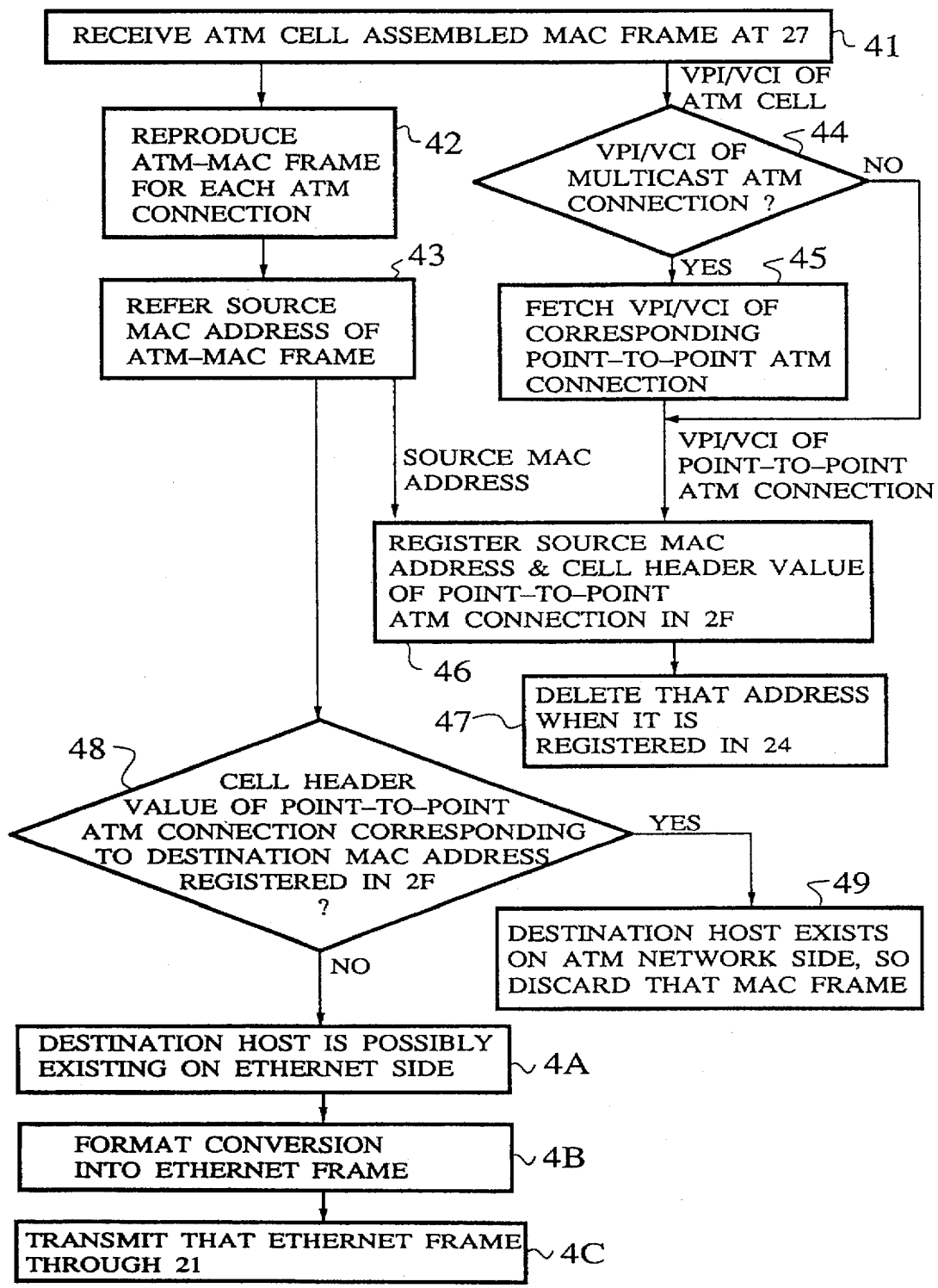
FIG. 5 is a flow chart for an operation of the bridge device of FIG. 3 in a case of the data flow from the ATM network to the ethernet side.

Also, as the processing sequences at this bridge device 11, a flow chart for an operation of data flow from the ethernet to the ATM network side is shown in FIG. 4 while a flow chart for an operation of data flow from the ATM network to the ethernet side is shown in FIG. 5.

First, with reference to FIGS. 3 and 4, the function of the bridge device 11 in a case of the data flow from the ethernet to the ATM network side will be explained.

When the MAC frame (also referred hereafter as the ethernet frame) arrives from the ethernet 1A, this MAC frame is received by the ethernet side physical interface unit 21 (step 31), and after receiving the MAC layer processing (CSMA/CD processing) therein, it is reconstructed as the internal MAC frame and handed over to the MAC address referring unit 22. Here the internal MAC frame is a frame in which the fields dependent on the MAC layer are removed from the received MAC frame, which is obtained in this case by removing the preamble field and the frame start delimiter from the received MAC field.

At the MAC address referring unit 22, the source MAC address in the internal MAC frame is referred, and when this source MAC address is a MAC address which has not been received before, this source MAC address is registered into the ethernet side MAC address table 24 (step 32). Thus, the ethernet side MAC address table 24 registers all the MAC addresses of the hosts existing on the ethernet 1A side which have been recognized by the bridge device 11 up until each moment.

The internal MAC frame is then handed over to the MAC address filtering unit 23. Here, whether the destination address of the internal MAC frame is registered in the ethernet side MAC address table 24 or not is checked (step 33). If it is registered there, it can be judged that the host to be the destination of the received MAC frame is existing on the ethernet 1A side, so that the internal MAC frame is discarded here (step 84). On the other hand, if it is not registered there, it is judged that there is a possibility for the host to be the destination of the received MAC frame to be existing on the ATM network 10 side (step 85), and the internal MAC frame is handed over to the ATM-MAC frame formation unit 25. By means of this configuration, there is no need to transmit the unnecessary MAC frame to the ATM network 10 side, so that the unnecessary traffic in the ATM network 10 can be suppressed.

At the ATM-MAC frame formation unit 25, the format conversion of the internal MAC frame according to the MAC frame format determined at the ATM network 10 is carried out (step 36). As the protocol for defining this format conversion, the format defined by the RFC 1483 of the IETF or the format defined by the corresponding specification of the ATM forum (such as the LAN emulation specification for example) can be used. In the following, this format converted MAC frame will also be referred as the ATM-MAC frame.

The ATM-MAC frame formed at the ATM-MAC frame formation unit 25 is then ATM cell assembled at the AAL/ATM layer transmission processing unit 26. At this point, as a type of the AAL, the ALL type 5 may be used. This AAL/ATM layer transmission processing unit 26 carries out the ATM cell assembling by referring to the ATM network side MAC address table 2F to be described below.

Here, the ATM network side MAC address table 2F is a table having the MAC addresses and the cell header values as elements, and as the cell header value in this table, there is a case of entering the VPI/VCI value of the multicast ATM connection having the bridge device containing this table as a starting point and all the other bridge devices which are bridge interconnected with this bridge device as ending points, and a case of entering the VPI/VCI value of the point-to-point ATM connection. Here, the initial value of the cell header value in this ATM network side MAC address table 2F is set to be the cell header value of the multicast ATM connection. By means of this setting, even for the MAC frame destined to the MAC address for which the learning as described below is not yet completed in this ATM network side MAC address table 2F, it is possible to guarantee the arrival of that MAC frame at the destination host by transmitting that MAC frame through the multicast ATM connection, because the MAC frame transmitted through the multicast ATM connection reaches to all the bridge devices.

The AAL/ATM layer transmission processing unit 26 refers to the ATM network side MAC address table 2F by using the destination MAC address of the ATM-MAC frame to be transmitted to the ATM network 10 side as a key, and fetches the cell header value (VPI/VCI value) to be attached to the ATM cells.

Here, when the cell header value fetched from the ATM network side MAC address table 2F is the VPI/VCI value of the point-to-point ATM connection, i.e., when the destination MAC address is not a broadcast address (step S37 NO) and the VPI/VCI value of the point-to-point ATM connection is registered as the cell header value for the destination MAC address in the ATM network side MAC address table 2F (step 38 YES), the ATM cell assembling by attaching that cell header value is carried out (step 3A), and the ATM cell assembled MAC frame is transferred to the bridge device which directly accommodates the destination host through that point-to-point ATM connection (step 3C).

In this case, as the MAC frame is transferred through the point-to-point ATM connection, that MAC frame will not be transmitted to the bridge devices other than that which has the MAC address of the destination host, so that it is possible to reduce the traffic in the ATM network or the traffic in and out of the bridge device. Also, by transferring the MAC frame by using the point-to-point ATM connection, it is possible to transfer the MAC frame with the minimum latency.

On the other hand, when the cell header value fetched from the ATM network side MAC address table 2F is the VPI/VCI value of the multicast ATM connection, i.e., when the destination MAC address is a broadcast address (step 37 YES) or the VPI/VCI value of the point-to-point ATM connection is not registered as the cell header value for the destination MAC address in the ATM network side MAC address table 2F (step 38 NO), the VPI/VCI value of the point-to-multipoint ATM connection is registered as the cell header value corresponding to the destination MAC address in the ATM network side MAC address table 2F (step 39), the ATM cell assembling by attaching the cell header value of the multicast ATM connection is carried out (step 3B), and the ATM cell assembled MAC frame is transmitted to all the bridge devices through the multicast ATM connection (step 3C).

In this case, at each bridge device, the further transmission through that bridge device of the MAC frame which is not assigned to that bridge device is prevented by the address filtering by the MAC address filtering unit 2C as described below, so that it is possible to eliminate the wasteful traffic at the ethernet side beyond each bridge device.

Here, at the receiving side bridge device, by recognizing the multicast ATM connection from which the entered MAC frame has arrived, it is possible to register that MAC frame along with the cell header value of the point-to-point ATM connection into the ATM network side MAC address table 2F on that bridge device.

Thus, the transmitting side bridge device carries out the transmission through the multicast ATM connection when the receiving side bridge device which accommodates the host having the destination MAC address of the MAC frame to be transmitted cannot be identified, or when the destination MAC address is the broadcast address. In this case, that MAC frame is going to be transmitted to the bridge devices which do not accommodate the host to be the destination of that MAC frame.

In order to prevent such a transmission of the MAC frame to the bridge devices which do not accommodate the host to be the destination of that MAC frame, the transmitting side bridge device may also transmit an MAC frame called inquiry frame which urges the return of the MAC frame destined to that transmitting side bridge device from the receiving side host which has the destination MAC address of that MAC frame, in order to identify the correspondence relationship between that MAC address and the cell header value of the point-to-point ATM connection to the bridge device which is accommodating the host having that MAC address. For such an Inquiry frame, the ARP (Address Resolution Protocol) request packet or the In-ARP (Inverse ARP) request packet can be used.

In response, the receiving side host which received this inquiry frame then transmits the MAC frame called inquiry response frame with the MAC address of itself as the source MAC address and the MAC address of the transmitting side bridge device as the destination MAC address. The bridge device accommodating that receiving side host then transmits that inquiry response frame to the ATM network 10 side. At this point, the learning of the ATM network side MAC address table 2F should have already been completed, and therefore that MAC frame should be transmitted to the transmitting side bridge device through the point-to-point ATM connection, but it may be possible to transmit that MAC frame through the multicast ATM connection.

The transmitting side bridge device which received this inquiry response frame can then register the correspondence of the MAC address and the cell header value of the point-to-point ATM connection in the ATM network side MAC address table 2F by referring to the source address of the received inquiry response frame, so that the MAC frame with this destination MAC address can be transferred through the point-to-point ATM connection subsequently.

While such an operation for actively transmitting the inquiry frame is carried out, the transmitting side bridge device may transmit the MAC frame with the destination MAC address which has not yet been registered in the ATM network side MAC address table 2F at that moment through the multicast ATM connection. Else, the transmitting side bridge device may keep the MAC frame with the destination MAC address under the inquiry awaiting therein while the inquiry frame is transmitted, and transmit that MAC frame through the point-to-point ATM connection after the inquiry response frame arrives and that destination MAC address is registered in the ATM network side MAC address table 2F. In the latter case, the MAC frames to be transmitted through the multicast ATM connection will be reduced further, so that the further reduction of the traffic at the bridge device becomes possible. In addition, it is also possible to prevent an occurrence of The reversal of the orders by which the MAC frames arrive at the receiving side bridge device.

It is noted here that this operation may be carried out only in a case of receiving a plurality (two for example) of the MAC frames which are destined to the destination MAC address for which the cell header value of the point-to-point ATM connection is not registered in the ATM network side MAC address table 2F. In this manner, it is possible to register only those MAC addresses for which the exchanges among the bridge devices take places frequently, so that the ATM network side MAC address table 2F can be used more effectively.

Also, the switching from the point-to-multipoint ATM connection to the point-to-point ATM connection may be carried out when no MAC frame arrives during a prescribed period of time. By means of this, it also becomes possible to prevent an occurrence of the reversal of the orders by which the MAC frames arrive at the receiving side bridge device.

The ATM cell assembled MAC frame is then sent into the ATM connection indicated by its cell header value. Here, the establishment of a group of ATM connections (the multicast ATM connection and the point-to-point ATM connections) may be made at a time of the activation of the bridge device, or when the MAC frame required to be transmitted to the ATM network 10 side appears for the first time. Among these, the point-to-point ATM connections are to be added or disconnected as a number or bridge devices which are bridge interconnected increases or decreases. Also, a number of leaves of the multicast ATM connection is to be increased or decreased as a number of bridge devices which are bridge interconnected increases or decreases. The sending of the ATM cell into the ATM network 10 side is carried out by the ATM network side physical interface unit 27 after the physical layer processing is applied.

In this manner, the ATM-MAC frame sent into the ATM network 10 is distributed to the other bridge devices through the ATM connections 15 to 18.

Next, with references to FIGS. 3 and 5, the function of the bridge device 11 as a receiving side, i.e., in a case of the data flow from the ATM network to the ethernet side will be explained.

For the receiving side bridge device, as many as [(total number of the bridge devices in the ATM network 10)−1] of the point-to-point ATM connections having that receiving side bridge device as an ending point and as many as [(total number of the bridge devices in the ATM network 10)−1] of the multicast ATM connections having that receiving side bridge device as one of ending points are provided. Here, the point-to-point ATM connection and the multicast ATM connection always come in pair. That is, there always exist the point-to-point ATM connection and the multicast ATM connection which have the same bridge device as their starting point. The bridge identification table 2E is a table of correspondence between the cell header values of such a pair of ATM connections. By referring to this bridge identification table 2E, it is possible to learn the cell header value of the point-to-point ATM connection which is connected to the bridge that is a starting point of the multicast ATM connection. The registration into this bridge identification table 2E can be carried out at a time of the activation of the bridge, or at a time of the establishment of the ATM connection, for example.

When the ATM cell is received at the ATM network side physical interface unit 27 (step 41), after the physical layer processing is applied therein, the received ATM cell which is the ATM cell assembled MAC frame is ATM cell disassembled at the AAL/ATM layer reception processing unit 2A for each ATM connection according to the VPI/VCI value so as to reproduce the ATM-MAC frame (step 42), and the reproduced ATM-MAC frame is then handed over to the ATM-MAC address referring unit 2B which refers the source MAC address of the reproduced ATM-MAC frame (step 43).

At this point, the received cell header value (VPI/VCI value) is also notified to the bridge identification table 2E. At the bridge identification table 2E, whether the received cell header value (VPI/VCI value) is the cell header value of the multicast ATM connection or not is checked (step 44), and when it is the cell header value of the multicast ATM connection, the cell header value of the corresponding point-to-point ATM connection having the same starting point is handed over to the ATM network side MAC address table 2F (step 45). Also, when the received cell header value is the cell header value of the point-to-point ATM connection, that cell header value is handed over to the ATM network side MAC address table 2F as it is.

At the ATM-MAC address referring unit 2B, the source MAC address of the received ATM-MAC frame is referred, and when it is the MAC address which has not been received before, registers this source MAC address into the ATM network side MAC address table 2F (step 46). At this point, it should be noted that the source MAC address is registered in the ATM network side MAC address table 2F by being paired with the cell header value of the point-to-point ATM connection notified from the bridge identification table 2E at the same time. Also, in a case the source MAC address of the received ATM-MAC frame is registered in the ethernet side MAC address table 24, this address is deleted from the ethernet side MAC address table 24 (step 47).

As described above, the ATM network side MAC address table 2F has the MAC address and the VPI/VCI value of the ATM connection which is connected to the bridge device accommodating the host having that MAC address as the entry data. In this manner, the bridge device comprehends the correspondence relationship of each ATM connection and the transmitting side bridge device, so that by referring to the ATM network side MAC address table 2F, it is possible to learn which host having which MAC address is connected with which bridge device. Thus, this ATM network side MAC address table 2F can be utilized when the AAL/ATM layer transmission processing unit 26 transmits the MAC frame by specifying the cell header value of the ATM connection connected to the bridge device which accommodates the destination of that MAC frame In the flow from the ethernet to the ATM network side.

Also, the bridge device can learn the MAC address of the host existing on the ATM network side which has been recognized by that bridge device at that moment by looking through this ATM network side MAC address table 2F. This type of usage of the ATM network side MAC address table 2F will be made at the MAC address filtering unit 2C as will be described below.

The ATM-MAC frame is then converted into the format of the internal MAC frame at the ATM-MAC address referring unit 2B, and handed over to the MAC address filtering unit 2C. There, whether the cell header value of the point-to-point ATM connection corresponding to the destination MAC address of that internal MAC frame is registered in the ATM network side MAC address table 2F or not is checked (step 48), and when it is registered, it can be judged that the host to be the destination of that MAC frame is existing on the ATM network side, looking from the bridge device, so that this internal MAC frame is discarded here (step 49). On the other hand, when it is not registered, it is judged that there is a possibility for the host to be the destination of that MAC frame to be existing on the ethernet side (step 4A), and this internal MAC frame is handed over to the MAC frame formation unit 2D. By means of this configuration, there is no need to transmit the unnecessary MAC frame to .the ethernet side, so that the unnecessary traffic in the ethernet can be suppressed.

Here, in order to carry out the above operation quickly, a bit indicating whether the cell header value registered in the ATM network side MAC address table 2F is the cell header value of the point-to-point ATM connection or not may be provided as an additional entry.

At the MAC frame formation unit 2D, the format conversion of the internal MAC frame according to the MAC frame format determined at the ethernet is carried out, and then it is handed over to the ethernet side physical interface unit 21 (step 4B). This ethernet frame is then transmitted to the ethernet side through the ethernet side physical interface unit 21 (step 4C).

Now, a case In which the broadcast address is used as the destination MAC address of the MAC frame will be described. In this case, for the flow from the ethernet to the ATM network side, the filtering at the MAC address filtering unit 23 is not carried out, and this MAC frame is sent into the multicast ATM connection having that bridge device as a starting point. For example, in a case of the bridge device 11, this MAC frame is sent into the ATM connection 18. Also, for the flow from the ATM network to the ethernet side, the filtering at the MAC address filtering unit 23 is not carried out, and it suffices to let this MAC frame to pass through the bridge device.

In this manner, by using the point-to-point ATM connection connected to the bridge device accommodating the destination MAC address whenever such a bridge device can be identified, and using the multicast ATM connection for the broadcast frame, it is possible to suppress the increase of the traffic In the ATM network due to the transmission of the unnecessary MAC frames.

In addition, by providing the learning mechanism as described above, it becomes possible to produce the correspondence table of the MAC address information and the cell header information (identification information of the point-to-point ATM connection connected to the bridge device accommodating the host having that MAC address) automatically.

By means of the above operation, the bridge interconnections among the ethernet LANs 1A to 1D connected to the ATM network 10 can be realized in this first embodiment.

Figure 6:
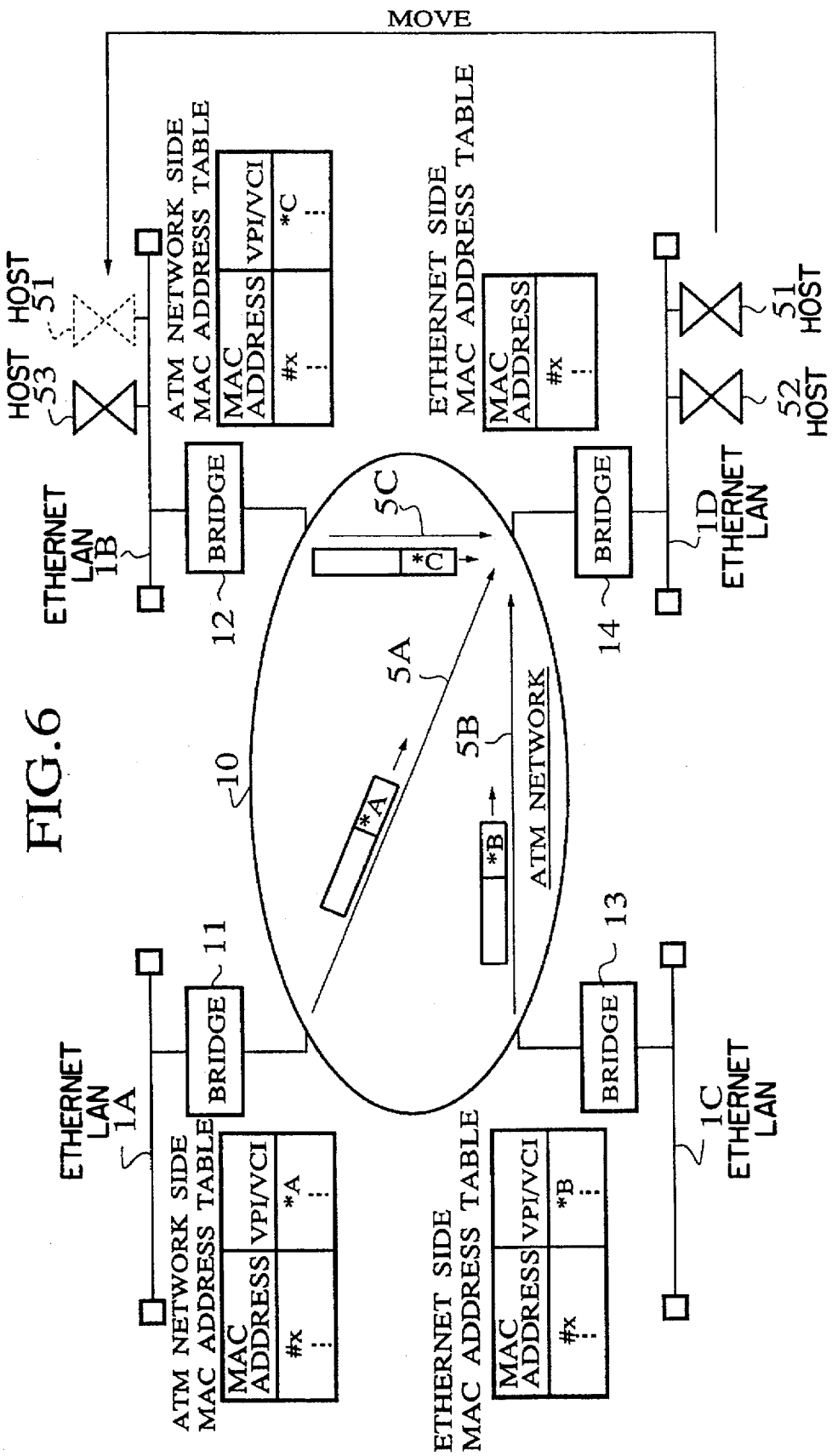
FIG. 6 is a diagram of the system of FIG. 2 in a case of including a moving host, showing a state before the moving host moves.

Next, a case in which the moving host exists on the ethernet LANs 1A to 1D will be described. As an illustrative example, a case in which a host 51 on the ethernet 1D moves to the ethernet 1B as shown in FIG. 6 will be considered here. According to the above description, when the host 51 is existing on the ethernet 1D, the host 51 is registered in the ethernet side or the ATM network side MAC address table at each bridge device as indicated in FIG. 6. When this host 51 has moved from the ethernet 1D to the other ethernet (ethernet 1B in this example), as this host 51 is registered in each MAC table as indicated in FIG. 6, the MAC frame with the destination MAC address "#x" transmitted from any host other than those on the the ethernet 1B (such as a host 53) would not flow into the ethernet 1B because of the filtering according to the MAC address table. For instance, the MAC frame destined to the host 51 which has the ethernet 1A or 1C as a starting point would reach the bridge device 14 through the ATM connections 5A or 5B, and then transmitted to the ethernet 1D according to the MAC address table in the bridge device 14, so that this MAC frame would not reach to the destined host 51 after this host 51 has moved.

Even in a case the MAC address "#x" has not been registered in the ATM network side MAC address table 2F at the bridge device 11 or 13 such that this MAC frame with this MAC address "#x" as the destination MAC address reaches to the bridge device 12 through the multicast ATM connection, this MAC address "#x" is registered in the ATM network side MAC address table 2F in the brides device 12, so that this MAC frame would be filtered out and discarded at the MAC address filtering unit 2C in the bridge device 12.

Also, the MAC frame having the ethernet 1D as a starting point would be filtered out and discarded at the MAC address filtering unit 23 in the bridge device 14 as the MAC address "#x" is registered in the ethernet side MAC address table 24 in the bridge device 14.

In order to deal with such a moving host, the following function can be added to the above described first embodiment. Namely, the moved host tramsmits some MAC frame by using the broadcast address as the destination MAC address. Then, as the broadcast address is used as the destination MAC address, this MAC frame passes through the bridge device 12 and reaches to all the other bridge devices through the multicast ATM connection. At this point, the following operations are carried out. (1) If the source address of the MAC frame from the ethernet side is registered in the ATM network side MAC address table 2F, this source address is deleted from the ATM network side MAC address table 2F and registered into the ethernet side MAC address table 24. (2) If the source address of the MAC frame from the ATM network side is registered in the ethernet side MAC address table 24, this source address is deleted from the ethernet side MAC address table 24 and registered into the ATM network side MAC address table 2F along with the cell header value of the point-to-point ATM connection connected to the bridge device from which this MAC frame is received.

Here, in a case the ATM network side MAC address table 2F is separately provided for each bridge device, it is necessary to carry out the above operation (2) for registering the MAC address in the ATM network side MAC address table 2F by the two step procedure of deleting the old registered information first, and then registering the MAC address in the ATM network side MAC address table 2F corresponding to the bridge device from which this MAC frame is received.

On the other hand, by using only one ATM network side MAC address table 2F and providing an entry for information on the bridge device corresponding to the MAC address or information such as a virtual connection by which the bridge device can be identified, the rewriting procedure can be simplified to the overwriting of the information related to the bridge device alone, such that the efficient table updating can be realized.

For the reason described above, when a plurality of virtual connections are to be multiplexed in a single physical interface as in the ATM network, it is effective to provide an entry for information on the corresponding bridge device in the ATM network side MAC address table 2F, rather than providing a separate table for each corresponding bridge device.

Figure 7:
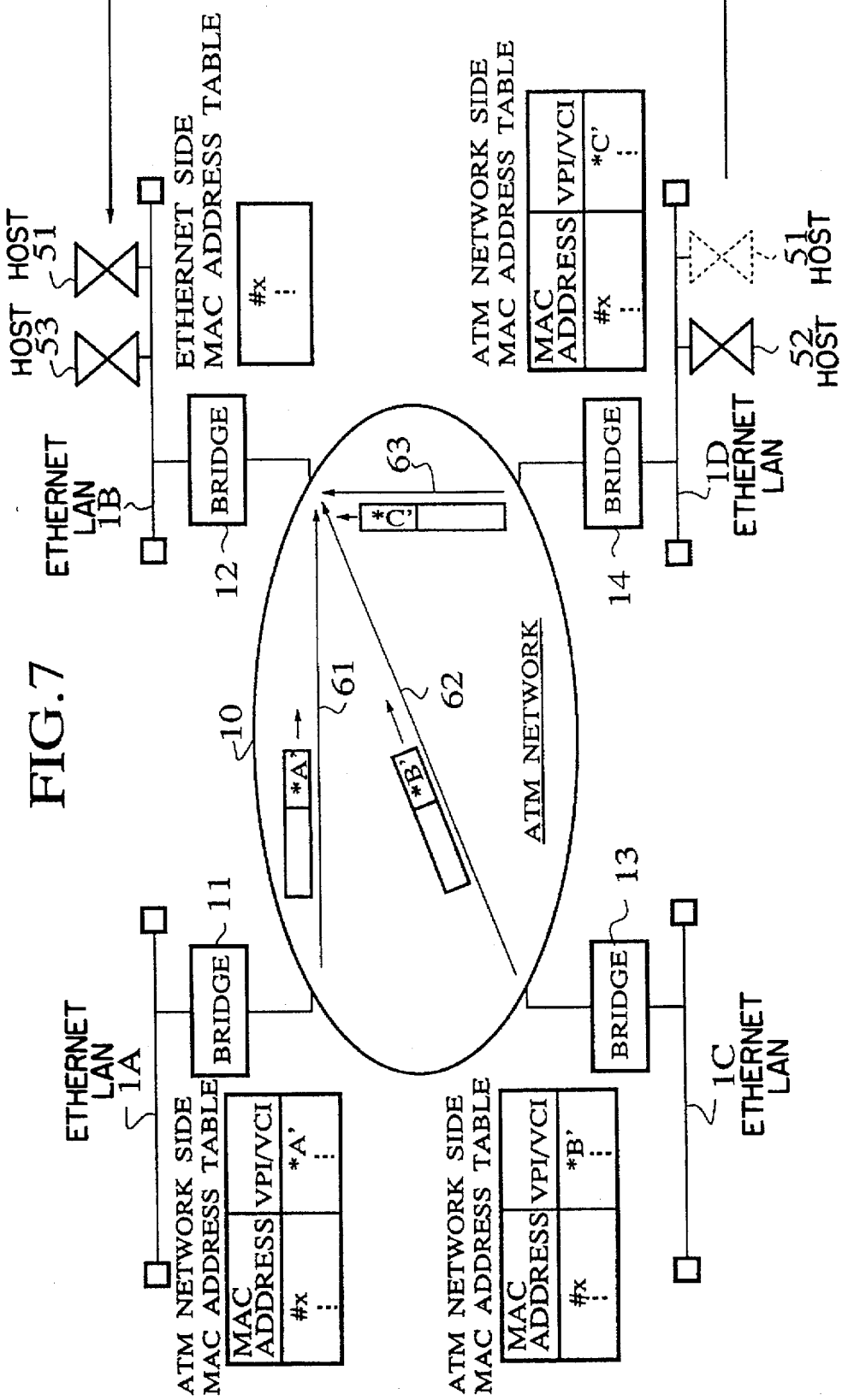
FIG. 7 is a diagram of the system of FIG. 2 in a case of including a moving host, showing a state after the moving host has moved.

By the above described table updating operation, a state of the MAC address tables is changed from that indicated in FIG. 6 to that indicated in FIG. 7. In the updated state of FIG. 7, the MAC frames with the destination MAC address "#x" are transferred to the bridge device 12 through the point-to-point ATM connections 61, 62, and 63. In this case, the processing sequences at each bridge device are substantially similar to those shown in FIGS. 4 and 5 described above.

By means of the above described additional function, it is also possible to deal with the moving host in the ATM bridge interconnection environment according to this first embodiment.

Next, the second embodiment of an ATM bridge device and an ATM bridging scheme according to the present invention will be described. This second embodiment concerns with a case in which the LAN emulation for the host existing in the ATM network is realized.

Figure 8:
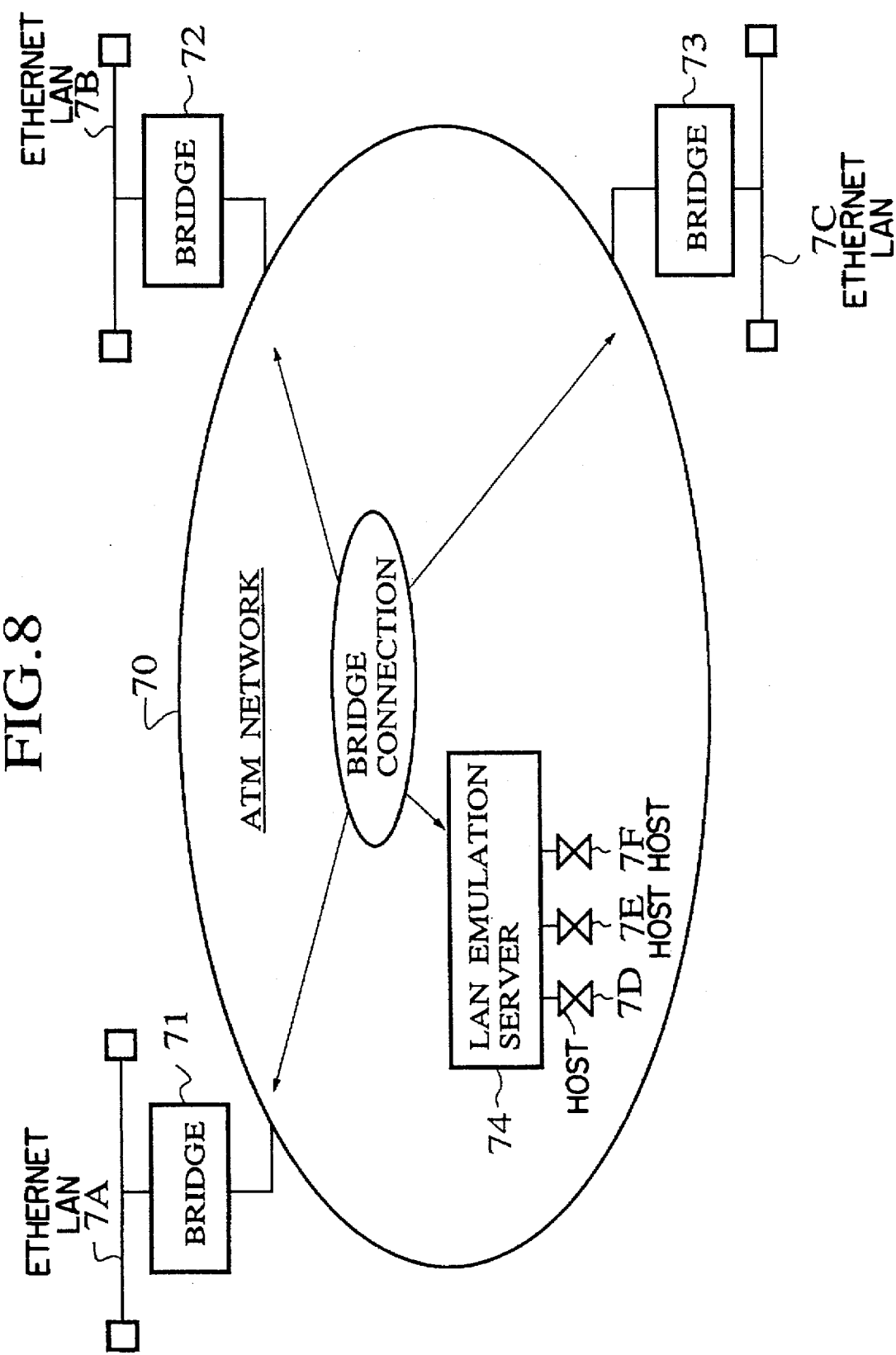
FIG. 8 is a diagram of an ATM communication system for a second embodiment of an ATM bridge device and an ATM bridging scheme according to the present invention.

In this second embodiment, the ATM communication system has an overall configuration as shown in FIG. 8, which comprises an ATM network 70, ethernet LANs 7A, 7B, and 7C which are non-ATM communication networks, a LAN emulation server 74 (abbreviated hereafter as an LE server) connected with hosts 7D, 7E, and 7F located within the ATM network 70, and bridge devices 71, 72, and 73 for making bridge interconnections between the ATM network 70 including the LE server 74 and the ethernet LANs 7A, 7B, and 7C, respectively, so as to construct an ATM bridge interconnection environment. Here, the ATM network 70 and the ethernet LANs 7A to 7C have functions similar to those in the first embodiment described above, except for the presence of the LE server 74 in the ATM network 70.

Figure 9:
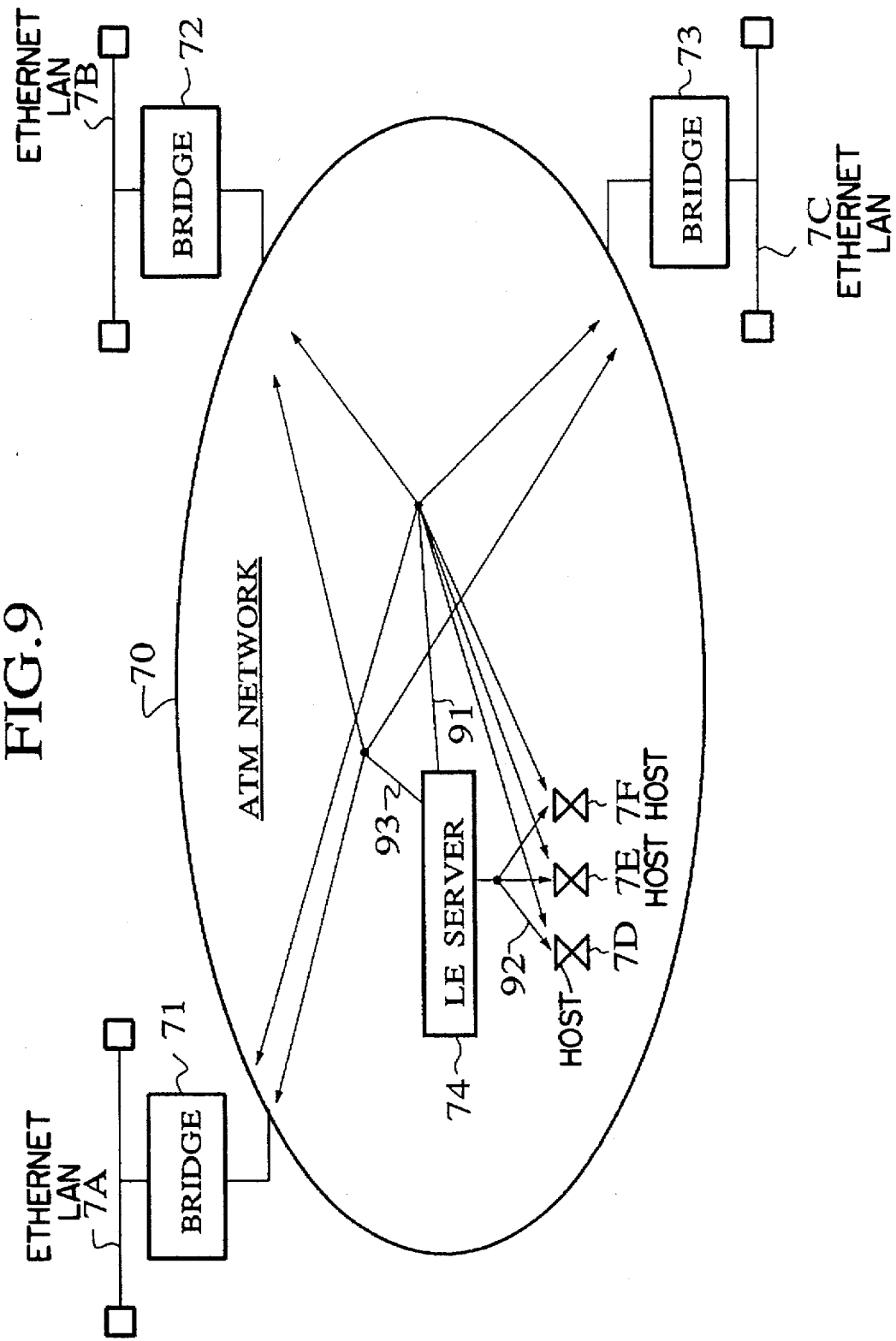
FIG. 9 is a diagram of the system of FIG. 8, showing three types of multicast connections used in the second embodiment.

In this system of FIG. 8, the connections among the hosts connected with the ethernet LANs 7A to 7C and the LE server 74 are the bridge interconnections, so that the network layer address (such as the IP address) of these hosts have the same network address (net ID or sub-net ID). Here, the ATM network 70 also establishes a multicast ATM connection 93 as shown in FIG. 9 which has the LE server 74 as a starting point and all the bridge devices and any other LE servers (not shown) which are bridge interconnected as ending points, and point-to-point ATM connections which has the LE server 74 as a starting point and each of the bridge devices as ending points, in addition to the ATM connections as in the first embodiment described above.

Here, the hosts 7D to 7F connected with the LE server 74 behave as if they are connected with the ethernet LANs 7A to 7C, so that it can be said that the LAN emulation is realized in this system. For this reason, the hosts 7D to 7F connected with the LE server 74 can use the already existing software applications which presuppose the connection with the ethernet, without requiring any modification.

Figure 10:
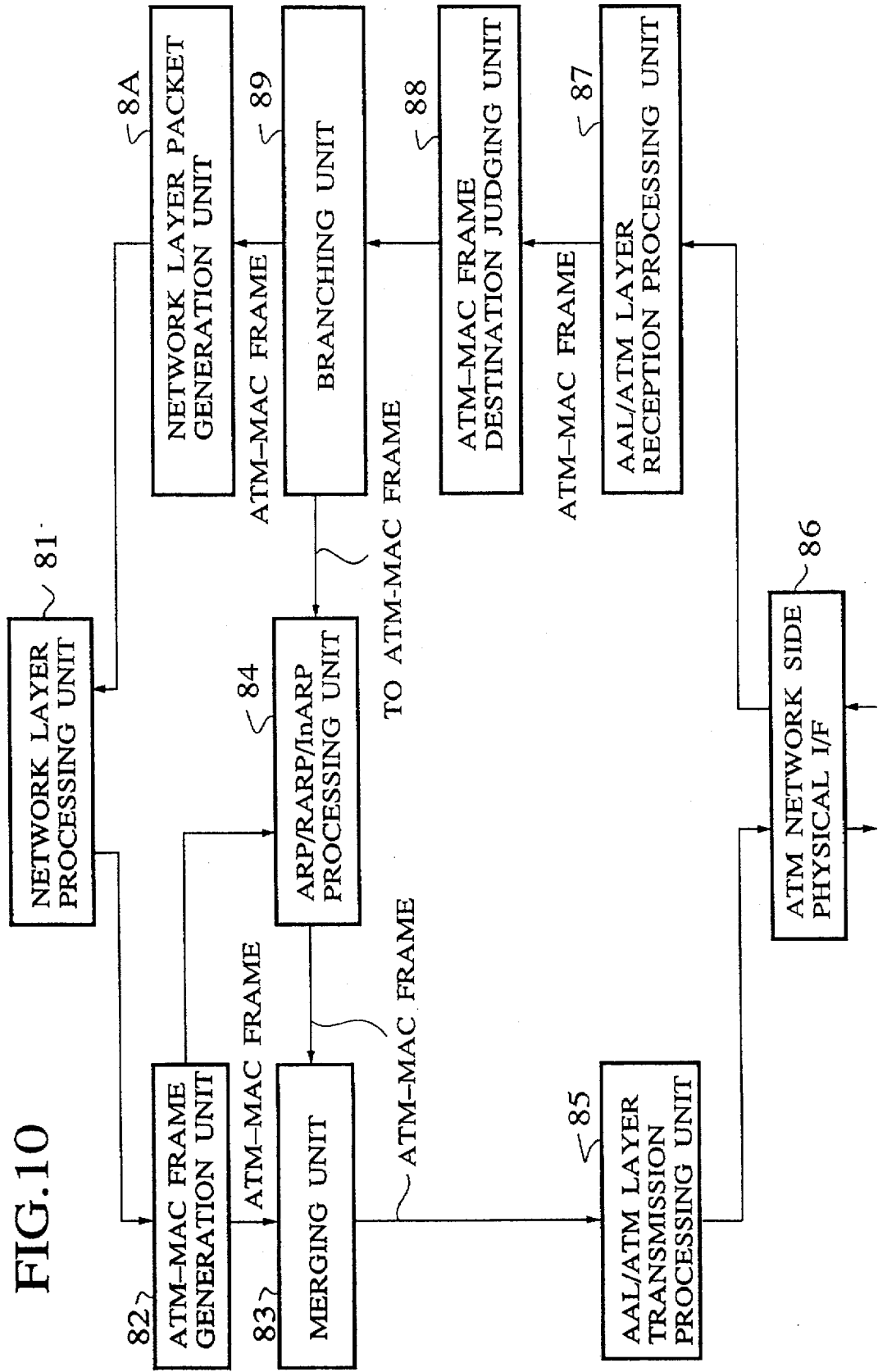
FIG. 10 is a block diagram of an internal configuration of a LAN emulation host in the system of FIG. 8.

Now, each of the hosts 7D to 7F connected with time LE server 74 has an internal structure as shown In FIG. 10. In this second embodiment, each of the hosts 7D to 7F connected with the LE server 74 is recognizing itself as being connected with the ethernet or bridge interconnected with the ethernet, and for each packet to make the LAN emulation which is given by a network layer processing unit 81, a layer 3 packet (such as the IP packet) that is to be transmitted from that host to the external is loaded into the MAC frame and this MAC frame is ATM cell assembled, and then the assembled ATM cell is entered into the ATM network 70, while the packet arrives from the ATM network 70 in a form of a MAC frame.

This MAC frame is in a format agreed among all the LE servers and the bridge devices which are bridge interconnected, and generated at an ATM-MAC frame generation unit 82. This MAC frame will be referred as the ATM-MAC frame. In other words, the ATM-MAC frame is a MAC frame in a format by which the exchanges of the MAC frames are carried out among the bridge devices and the LE servers which are bridge interconnected in the ATM network.

Here, between each host and the LE server, one bidirectional ATM connection is provided such that the exchange of the MAC frame is carried out through this ATM connection. This host is recognizing an identifier (cell header value) of this ATM connection, and the ATM-MAC frame which is to be either transmitted from that host to the external or entered into that host from the external is going to pass through that ATM connection. An AAL/ATM layer transmission processing unit 85 carries out the ATM cell assembling of the ATM-MAC frame and then sends the assembled ATM cell into this ATM connection through an ATM network side physical interface unit 86.

The cell entered from the ATM network side to this host through that ATM connection is received via the ATM network side physical interface unit 86 and applied with ATM cell disassembling at the AAL/ATM layer reception processing unit 87 so as to reproduce the ATM-MAC frame. The reproduced ATM-MAC frame is then given to an ATM-MAC frame destination judging unit 88 which judges whether this ATM-MAC frame is destined to this host itself or not. When it is judged to be destined to this host, next a branching unit 89 judges whether this ATM-MAC frame is to be applied with an ARP/RARP/InARP processing or to be taken into the network layer processing unit 81 of this host according to a frame type of that ATM-MAC frame, and carries out the following branching operation.

Namely, when it is judged to be applied with the ARP/RARP/InARP processing, that ATM-MAC frame is handed over to an ARP/RARP/InARP processing unit 84 for applying this ARP/RARP/InARP processing, and the processed ATM-MAC frame is multiplexed with another ATM-MAC frame coming from the ATM-MAC frame formation unit 82 at a merging unit 83, and then ATM cell assembled and transmitted to the ATM network side through the AAL/ATM layer transmission processing unit 85 and the ATM network side physical interface unit 86. On the other hand, when it is judged to be taken into the network layer processing unit 81 of this host, the MAC header/trailer is removed, and a network layer packet is produced at a network layer packet generation unit 8A from this ATM-MAC frame with the MAC header/trailer removed, and then handed over to the network layer processing unit 81.

Also, in this case, each of the hosts 7D to 7F has an internal function to carry out the ARP/RARP/InARP processing at the ARP/RARP/InARP processing unit 84 with respect to each ATM-MAC frame generated at the ATM-MAC frame generation unit 82, and the ATM-MAC frame resulting from this processing (such as that for an ARP response, an RARP response, or an InARP response) is multiplexed with the ATM-MAC frame transmitted from an upper layer (network layer or above) processing function side of the host at the merging unit 83, and then ATM cell assembled and transmitted to the ATM network side through the AAL/ATM layer transmission processing unit 85 and the ATM network side physical interface unit 86.

Next, the LAN emulation server 74 in this second embodiment will be described in detail.

Figure 11:
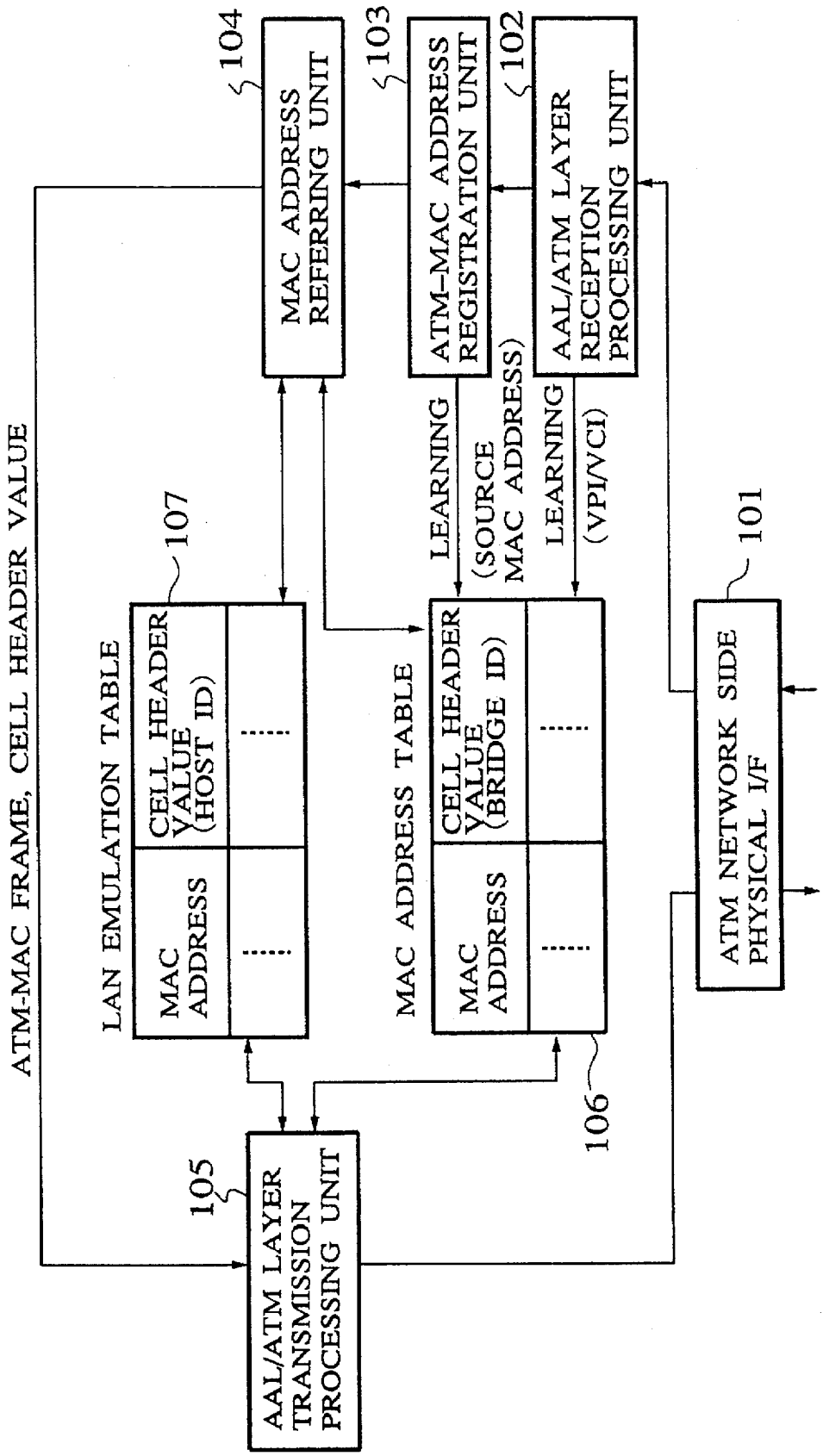
FIG. 11 is a block diagram of an internal configuration of a LAN emulation server in the system of FIG. 8.

In a case of realizing the bridge interconnections similar to those in the first embodiment described above, the LE server 74 has an internal configuration as shown in FIG. 11, and operates according to the flow chart of FIG. 12 as follows.

When the ATM cell assembled ATM-MAC frame is received at an ATM network side physical interface unit 101 (step 111), the ATM-MAC frame is reproduced from this at an AAL/ATM layer reception processing unit 102 (step 113), and handed over to an ATM-MAC address registration unit 103. At this point, the AAL/ATM layer reception processing unit 102 and the ATM-MAC address registration unit 103 refer to the cell header value and the source MAC address of the received cell and register them sequentially in a MAC address table 106, just as in a case of the registration of the ATM network side MAC address table 2F in the first embodiment described above (step 112). Here, however, the registration into the MAC address table 106 is omitted for the hosts 7D to 7F (also referred hereafter as LAN emulation hosts or LE hosts) which are directly supported by the LE server 74. This provision is adopted in order to prevent the ATM-MAC frame destined to the LE host from being always discarded by a destination MAC address filtering at a next MAC address referring unit 104. This provision of not registering the MAC address of the LE host in the MAC address table 106 can be actually implemented by a scheme of not carrying out the registration into the MAC address table 106 for those MAC addresses which are registered in an LAN emulation table (LE table) 107 to be described below.

Then, the MAC address referring unit 104 carries out the following operation. First, by referring to the LE table 107, whether the destination address of the MAC frame under processing is registered in the LE table 107 or not is checked (step 114). If the destination MAC address of the MAC frame under processing is registered in the LE table 107, it is judged that the destination indicated by this destination MAC address is the LE host (step 115), and the cell header value of the ATM connection connected to this LE host is fetched from the LE table 107, and the fetched cell header value and this MAC frame are sent to an AAL/ATM layer transmission processing unit 105, such that the AAL/ATM layer transmission processing unit 105 carries out the ATM cell assembling of this MAC frame by attaching this cell header value (step 116), and the assembled ATM cell is transmitted to the ATM network 70 at the ATM network side physical interface unit 101 (step 11H).

On the other hand, when the destination MAC address of the MAC frame under processing is not registered in the LE table 107, it is judged that either this destination MAC address is a broadcast address, or else the destination indicated by this destination MAC address is a host not directly accommodated by the LE server 74 (step 117). From here on, the processing differs for a case in which the host which transmitted this MAC frame is the LE host directly accommodated by the LE server and a case in which the host which transmitted this MAC frame is the bridge device or another LE server which is bridge interconnected with this LE server 74.

First, whether the source address of this MAC frame is registered in the LE table 107 or not is checked (step 118). Here, in a case the source address of this MAC frame is not registered in the LE table 107, this MAC frame is a MAC frame transmitted from the bridge device or another LE server which is bridge interconnected with this LE server 74. Consequently, whether the destination MAC address of this MAC frame is the broadcast address or not is checked (step 11E) next, and when this destination MAC address is not the broadcast address, this MAC frame is discarded (step 11F) because in this case it is guaranteed by referring to the LE table 107 that this LE server 74 does not accommodate the host having this destination MAC address. On the other hand, when this destination MAC address is the broadcast address, this MAC frame is ATM cell assembled at the AAL/ATM layer transmission processing unit 105 by attaching the cell header value for a transmission to all the LE hosts accommodated by this LE server 74 (step 11G), and the assembled ATM cell is transmitted to the ATM network 70 at the ATM network side physical interface unit 101 (step 11H) for the reason described below.

On the other hand, when the source address of this MAC frame is registered in the LE table 107 at the step 118, this MAC frame is a MAC frame transmitted from the LE host which is directly accommodated by this LE server 74. Consequently, whether the destination MAC address of this MAC frame is the broadcast address or not is checked (step 119) next, and when this destination MAC address is the broadcast address, this MAC frame is ATM cell assembled at the AAL/ATM layer transmission processing unit 105 by attaching the cell header value for a transmission to all the LE hosts accommodated by this LE server 74 and all the bridge devices and other LE servers which are beidge interconnected to this LE server 74 (step 11D), and the assembled ATM cell is transmitted to the ATM network 70 at the ATM network side physical interface unit 101 (step 11H). On the other hand, when this destination MAC address is not the broadcast address, the following operation similar to that in the first embodiment described above is carried out.

Namely, whether the destination MAC address of this MAC frame is registered in the MAC address table 106 or not is checked (step 11A), and in a case this destination MAC address is not registered, this MAC frame is ATM cell assembled at the AAL/ATM layer transmission processing unit 105 by attaching the cell header value for a transmission to all the bridge devices and other LE servers which are bridge interconnected to this LE server 74 (step 11C), and the assembled ATM cell is transmitted to the ATM network 70 at the ATM network side physical interface unit 101 (step 11H). On the other hand, when this destination MAC address is registered in the MAC address table 106, this MAC frame is ATM cell assembled at the AAL/ATM layer transmission processing unit 105 by attaching the cell header value registered in the MAC address table 106 (step 11B), and the assembled ATM cell is transmitted to the ATM network 70 at the ATM network side physical interface unit 101 (step 11H).

In this manner, it is possible to prevent such a MAC frame which has the broadcast address as the destination MAC address or which should carry out the broadcasting (referred hereafter as a broadcasting MAC flame) from being circulated indefinitely in the ATM network. Namely, if the broadcasting MAC frame which is transmitted from the other bridge device or LE server in the ATM network is returned (relayed) to the other bridge device or LE server side again, that other LE server is going to carry out the similar operation, and this broadcasting MAC frame is going to be transferred among the LE servers indefinitely.

As in the above, in this second embodiment, the source address of the MAC frame received by the LE server is checked, and when it is a MAC frame from the other bridge device or LE server which is bridge interconnected to this LE server, or when it is not an LE host directly accommodated by this LE server, by transferring this MAC frame only to the LE hosts side and not to the other bridge devices or LE servers side, the occurrence of the above described indefinite loop can be prevented.

Figure 12B:
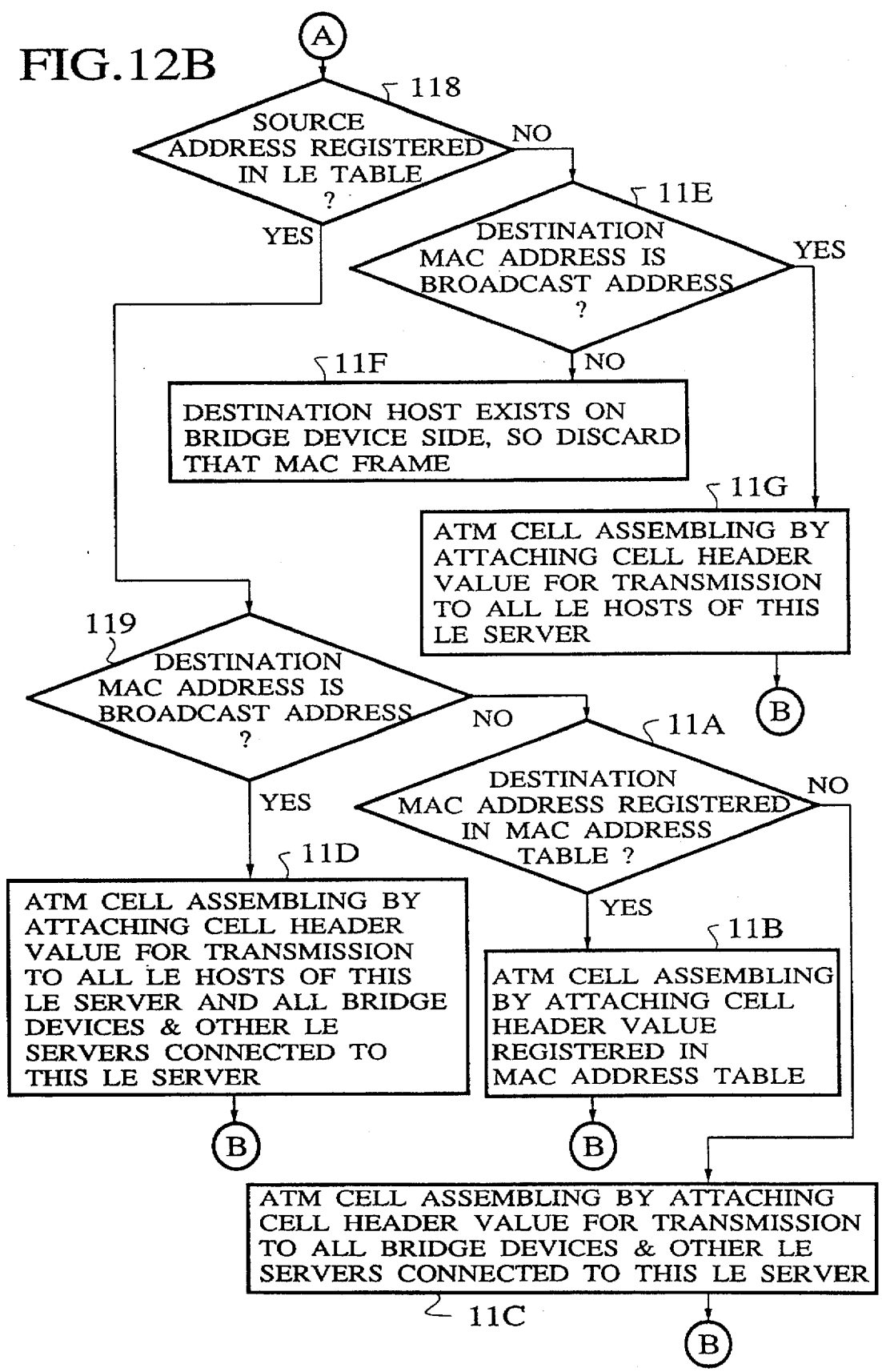

Here, in a case of making the bridge interconnection/LAN emulation as in FIG. 8 for example, the MAC frame which has the broadcast address or the MAC address not registered in the MAC address table 106 as the destination MAC address, the following provision may be adopted. Namely, by providing the multicast ATM connections 91, 92, and 93 as shown in FIG. 9, and:

(1) the MAC frame to be transferred to all the LE hosts directly accommodated by this LE server is transmitted with respect to the multicast ATM connection 92 (at the step 11G in FIG. 12);

(2) the MAC frame to be transferred to all the bridge devices and the other LE servers which are bridge interconnected to this LE server is transmitted with respect to the multicast ATM connection 93 (at the step 11C in FIG. 12); and (3) the MAC frame to be transferred to all the LE hosts directly accommodated by this LE server and all the bridge devices and the other LE servers which are bridge interconnected to this LE server is transmitted with respect to the multicast ATM connection 91 (at the step 11D in FIG. 12).

As such, in a case of incorporating the LE server in the bridge interconnection in the ATM network, various types of broadcasting scheme are required depending on the source address of the MAC frame, and by providing various types of multicast ATM connections, it becomes possible to deal with a type of broadcasting scheme required in making the bridge interconnection of the LE server by simply using the multicast ATM connection that can be realized easily in the ATM network.

As for the LE hosts accommodated by this, LE server, the MAC addresses of these LE hosts and the cell header values of the point-to-point ATM connections connected to these LE hosts are registered in the LE table 107. The registration of this LE table 107 can be carried out at a time of activating or modifying the LE server or the LE hosts.

Next, the third embodiment of an ATM bridge device and an ATM bridging scheme according to the present invention will be described.

Figure 13:
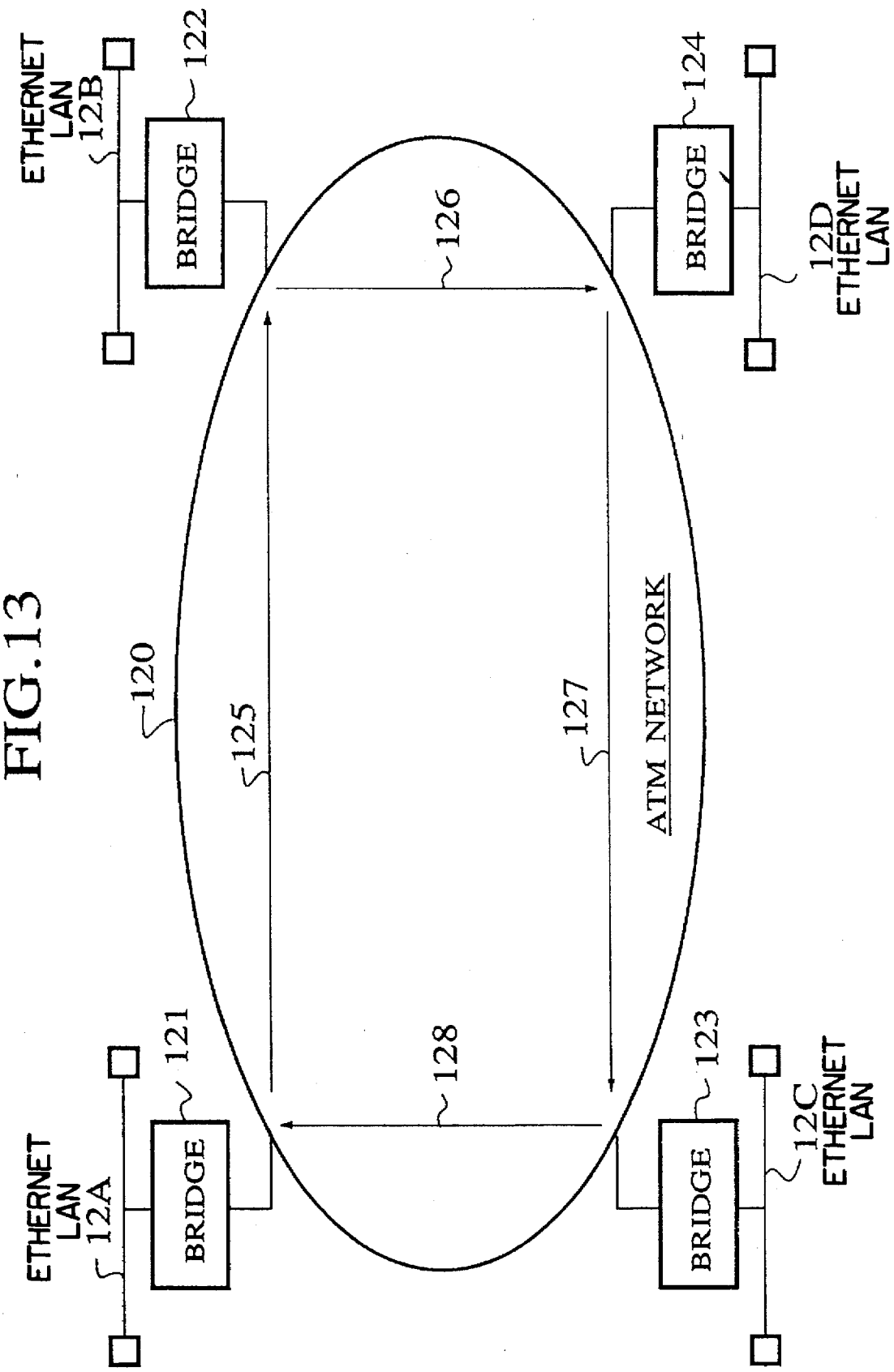
FIG. 13 is a diagram of an ATM communication system for a third embodiment of an ATM bridge device and an ATM bridging scheme according to the present invention.

In this third embodiment, the ATM communication system has an overall configuration as shown in FIG. 13, which comprises an ATM network 120, ethernet LANs 12A, 12B, 12C, and 12D which are non-ATM communication networks, and bridge devices 121, 122, 123, and 124 for making bridge interconnections between the ATM network 120 and the ethernet LANs 12A, 12B, 12C, and 12D, respectively, so as to construct an ATM bridge interconnection environment. Here, the ATM network 120 and the ethernet LANs 12A to 12D have functions similar to those in the first embodiment described above.

In this system of FIG. 13, the connections among the hosts connected with the ethernet LANs 12A to 12D are the bridge interconnections, so that the network layer address (such as the IP address) of these hosts have the same network address (net ID or sub-net ID). Here, the ATM network 120 establishes point-to-point ATM connections 125, 126, 127, and 128, each of which have each bridge device as a starting point and a neighboring bridge device as an ending point. Namely, as can be seen in FIG. 18, these ATM connections are formed to interconnect all these bridge devices 121 to 124 in a loop shape, and the exchanges of the MAC frame among the ethernets 12A to 12D which are bridge interconnected are carried out through these loop shaped ATM connections 121 to 124.

Now, the function of each of the bridge devices 121 to 124 will be described in detail. Here, all of the bridge devices 121 to 124 have similar configuration and function, so that only a case of the bridge device 121 will be described below as a representative case.

Figure 14:
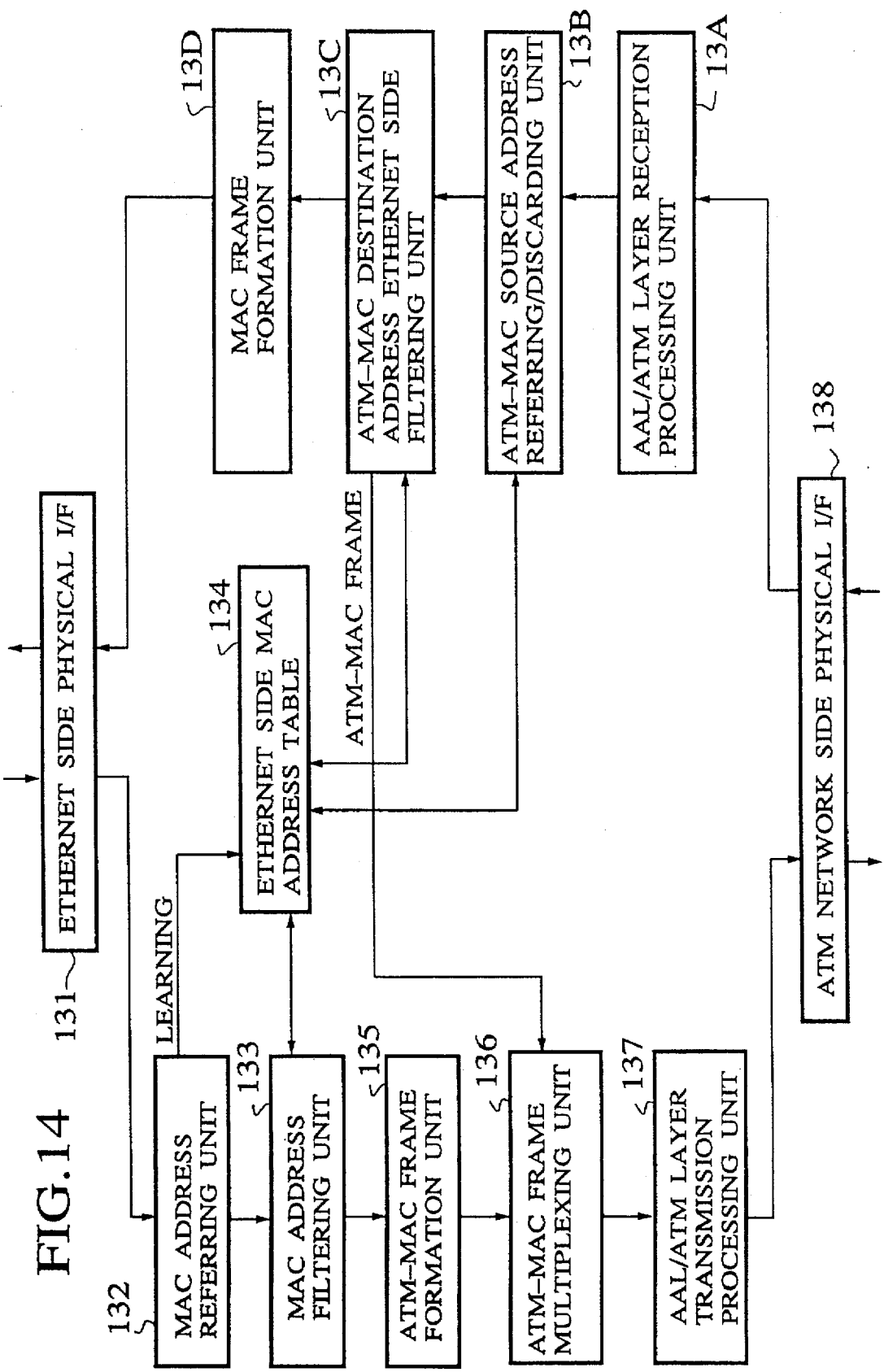
FIG. 14 is a block diagram of an internal configuration of a bridge device in the system of FIG. 13.

In this third embodiment, the bridge device 121 has an internal configuration shown in FIG. 14, which has an ethernet side physical interface unit 131 connected with the ethernet LAN 12A and an ATM network side physical interface unit 138 connected with the ATM network 120. Between them, for handling the data flow from the ethernet side to the ATM network side, there are provided a MAC address referring unit 132, a MAC address filtering unit 133, an ATM-MAC frame formation unit 135, an ATM-MAC frame multiplexing unit 136, and an AAL/ATM layer transmission processing unit 137, and for handling the data flow from the ATM network side to the ethernet side, there are provided an AAL/ATM layer reception processing unit 13A, an ATM-MAC source address referring/discarding unit 13B, an ATM-MAC destination address ethernet side filtering unit 13C, and a MAC frame formation unit 13D. In addition, an ethernet side MAC address table 134 is provided with respect to the MAC address referring unit 132 and the MAC address filtering unit 133, as well as the ATM-MAC destination address ethernet side filtering unit 13C and the ATM-MAC source address referring/discarding unit 13B, where the ATM-MAC destination address ethernet side filtering unit 13C is connected with the ATM-MAC frame multiplexing unit 136. Here, the ethernet side physical interface unit 131, the MAC address referring unit 132, the MAC address filtering unit 133, the ethernet side MAC address table 134, and the ATM-MAC frame formation unit 135 have functions similar to the corresponding elements in the first embodiment described above.

Figure 15:
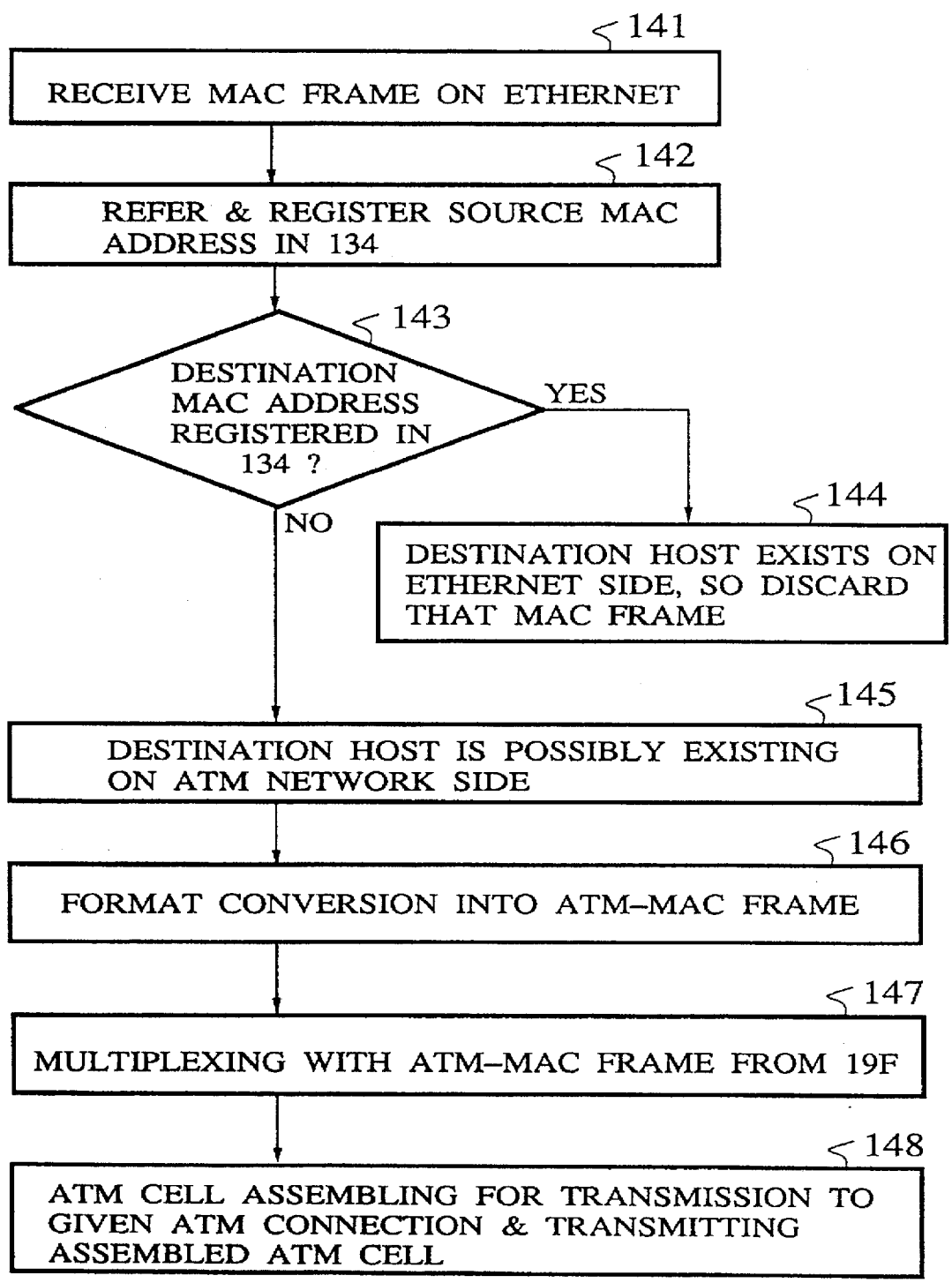
FIG. 15 is a flow chart for an operation of the bridge device of FIG. 14 in a case of the data flow from the ethernet to the ATM network side.
Figure 16:
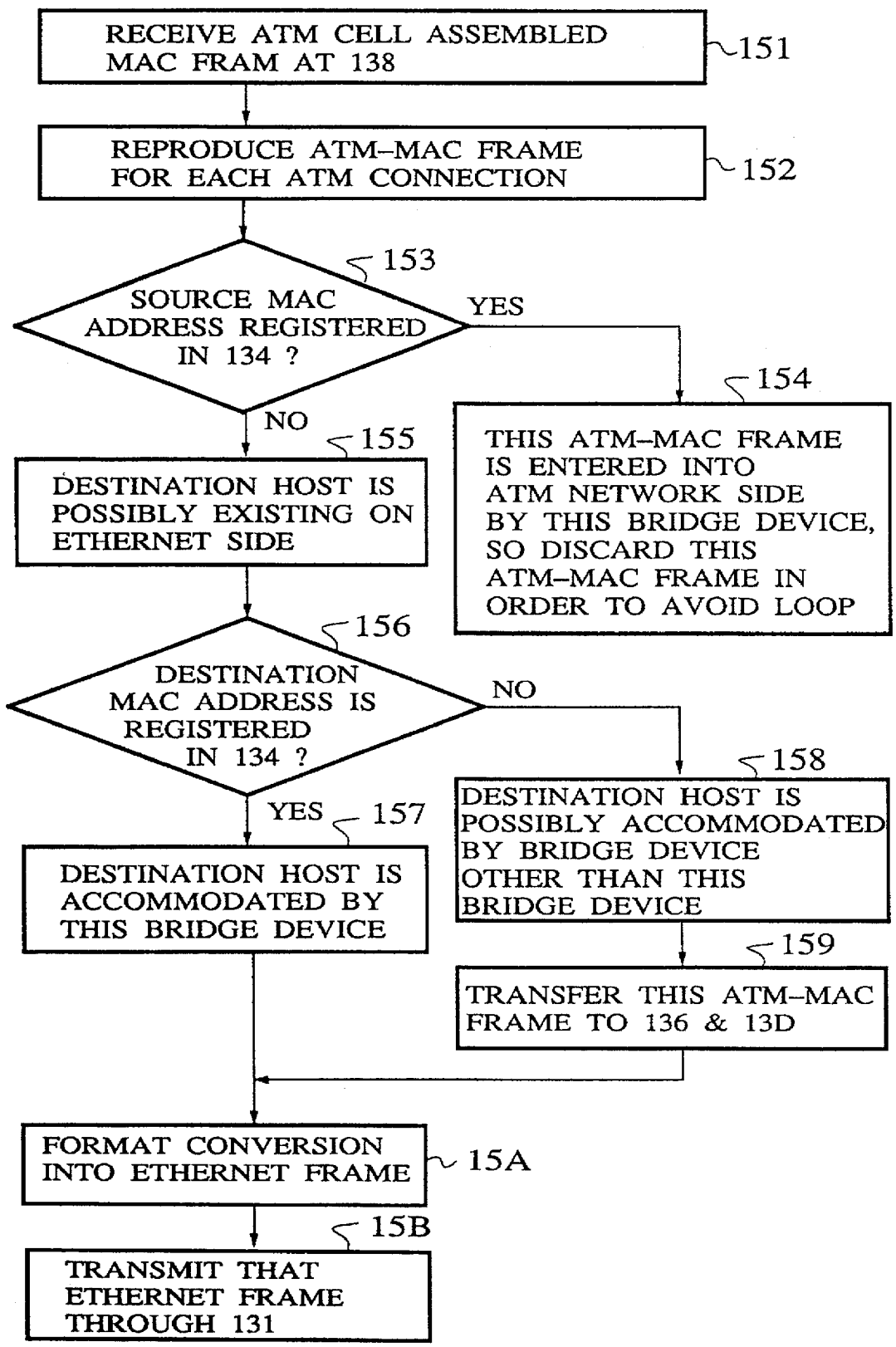
FIG. 16 is a flow chart for an operation of the bridge device of FIG. 14 in a case of the data flow from the ATM network to the ethernet side.

Also, as the processing sequences at this bridge device 121, a flow chart for an operation of data flow from the ethernet to the ATM network side is shown in FIG. 15, while a flow chart for an operation of data flow from the ATM network to the ethernet side is shown in FIG. 16.

First, with reference to FIGS. 14 and 15, the function of the bridge device 121 in a case of the data flow from the ethernet to the ATM network side will be explained.

In the flow chart of FIG. 15, the steps 141 to 146 are similar to the steps 31 to 36 in the flow chart of FIG. 4 for the first embodiment described above, except that the operation related to the ATM network side MAC address table 2F at the step 32 is omitted in the step 142.

Thus, when the MAC frame arrives from the ethernet 131A, this MAC frame is received by the ethernet side physical interface unit 131 (step 141), and after the MAC layer processing, it is reconstructed as the internal MAC frame and handed over to the MAC address referring unit 132.

At the MAC address referring unit 132, the source MAC address in the internal MAC frame is referred, and when this source MAC address is a MAC address which has not been received before, this source MAC address is registered into the ethernet side MAC address table 134 (step 142). Thus, the ethernet side MAC address table 134 registers all the MAC addresses of the hosts existing on the ethernet 12A side which have been recognized by the bridge device 121 up until each moment.

The internal MAC flame is then handed over to the MAC address filtering unit 133. Here, whether the destination address of the internal MAC frame is registered in the ethernet side MAC address table 134 or not is checked (step 148). If it is registered there, it can be judged that the host to be the destination of the received MAC frame is existing on the ethernet 12A side, so that the internal MAC frame is discarded here (step 144). On the other hand, if it is not registered there, it is judged that there is a possibility for the host to be the destination of the received MAC frame to be existing on the ATM network 120 side (step 145), and the internal MAC frame is handed over to the ATM-MAC frame formation unit 135.

At the ATM-MAC frame formation unit 135, the format conversion of the internal MAC frame according to the MAC frame format determined at the ATM network 120 is carried out (step 146) to obtain the ATM-MAC frame.

The ATM-MAC frame formed by the ATM-MAC frame formation unit 135 is then transmitted to the ATM-MAC frame multiplexing unit 136 which receives the ATM-MAC frames from the ATM-MAC frame formation unit 135 as well as the ATM-MAC destination address ethernet side filtering unit 13C and has a function of multiplexing these ATM-MAC frames and handing the multiplexed ATM-MAC frame to the AAL/ATM layer transmission processing unit 137 (step 147).

The AAL/ATM layer transmission processing unit 137 carries out the ATM cell assembling of the multiplexed ATM-MAC frame received from the ATM-MAC frame multiplexing unit 136 by attaching the cell header value of the ATM connection having this bridge device as a starting point among loop shaped group of ATM connections (that is, the ATM connection 125 for the bridge device 121).

The ATM cell assembled ATM-MAC frame is then transmitted to that ATM connection indicated by the cell header value through the ATM network side physical interface unit 138. Here, as already mentioned, the group of ATM connections are established to interconnect the bridge devices in the ATM network in a loop shape. The establishment or change of these ATM connections can be carried out at a time of the activation or change of the bridge devices.

In this manner, the MAC frame transferred in the ATM network is going to flow only through the ATM connections interconnecting the bridge devices in loop, which are basically as many as the number of bridge devices, so that it is possible to minimize the network resource in the ATM network that is consumed for the purpose of the bridge interconnections in this third embodiment.

The ATM-MAC frame entered into the ATM network 120 from the bridge device 121 is then transferred through the ATM connection 125 to the bridge device 122, and then after the reception sequence described below, further transferred through the ATM connection 126 to the bridge device 124, through the ATM connection 127 to the bridge device 123, and through the ATM connection 128 to the bridge device 121, in a form of a loop.

Next, with references to FIGS. 14 and 16 the function of the bridge device 122 which is a receiving side from a viewpoint of the ATM network 120, i.e., in a case of the data flow from the ATM network to the ethernet side will be explained.

Here, in the receiving side bridge device, there is only one ATM connection having that bridge device as an ending point. The ATM cell transmitted through this ATM connection is received at the ATM network side physical interface unit 138 (step 151), and the ATM-MAC frame is reproduced at the AAL/ATM layer reception processing unit 13A (step 152) and then handed over to the ATM-MAC source address referring/discarding unit 13B.

At the ATM-MAC source address referring/discarding unit 13B, the source address of the received ATM-MAC frame is referred, and compared with the MAC addresses in the ethernet side MAC address table 134 (step 153). When this source address coincides with any of the registered MAC addresses, this ATM-MAC frame is judged as entered into the loop shaped group of ATM connections of the ATM network 120 with this bridge device as a starting point, so that this ATM-MAC frame is discarded here in order to prevent this ATM-MAC frame from being entered into the loop shaped group of ATM connections again to circulate through the loop indefinitely (step 154). On the other hand, when this source address does not coincide with any of the registered MAC addresses, this ATM-MAC frame is judged as entered into the loop shaped group of ATM connections of the ATM network 120 by another bridge device other than this bridge device, and there is a possibility for the destination host to be existing on the ethernet connected to this bridge device (step 155).

Then, the ATM-MAC frame is handed over to the ATM-MAC destination address ethernet side filtering unit 13C, which refers to the destination MAC address of this ATM-MAC frame and compares with all the MAG addresses registered in the ethernet side MAC address table 134 (step 156). If this destination MAC address is registered, it is judged that the destination host of this ATM-MAC frame is accommodated by this bridge device (step 157), so that there is no need to further transfer this ATM-MAC frame to the other bridge devices. For this reason, this ATM-MAC frame is transferred only to the MAC frame formation unit 13D and not to the ATM-MAC frame multiplexing unit 136. Here, if the destination MAC address is the broadcast address or the multicast address, this ATM-MAC frame is not discarded here, and transmitted to the ATM-MAC frame multiplexing unit 136 as well.

On the other hand, if this destination MAC address is nor registered at the step 156, there is a possibility for the destination host having this MAC address to be accommodated by this bridge device or by another bridge device in the lower stream side (step 158), so that this ATM-MAC frame is transferred to both the MAC frame formation unit 13D and the ATM-MAC frame multiplexing unit 136 (step 159). In this case, the ATM-MAC frame transferred to the ATM-MAC frame multiplexing unit 136 is then going to be transferred to the bridge device 124 which is a next bridge device from a viewpoint of this bridge device 122.

The MAC frame formation unit 13D carries out the format conversion on the received ATM-MAC frame to obtain the ethernet frame (step 15A), and the obtained ethernet frame is transmitted from the ethernet side physical interface unit 131 (step 15B).

Now, a case in which the broadcast address is used as the destination MAC address of the MAC frame will be described. In this case, for the flow from the ethernet to the ATM network side, the filtering at the MAC address filtering unit 133 is not carried out, and this MAC frame is sent into the ATM connection having that bridge device as a starting point and connected to the next bridge device. For example, in a case of the bridge device 122, this MAC frame is sent into the ATM connection 126. Also, for the flow from the ATM network to the ethernet side, the filtering at the ATM-MAC destination address ethernet side filtering unit 13C is not carried out, and it suffices to let this MAC frame to pass through the bridge device to the ethernet side while also relaying this MAC frame to the next bridge device.

By means of the operations described above, it is possible to realize the bridge interconnections among the ethernets 12A to 12D connected to the ATM network 120 in this third embodiment.

Next, the fourth embodiment of an ATM bridge device and an ATM bridging scheme according to the present invention will be described.

In this fourth embodiment, the ATM communication system has an overall configuration as shown in FIG. 17, which comprises an ATM network 160, ethernet LANs 16A, 16B, and 16C which are non-ATM communication networks, and bridge devices 161, 162, and 163 for making bridge interconnections between the ATM network 160 and the ethernet LANs 16A, 16B, and 16C, respectively, so as to construct an ATM bridge interconnection environment. Here, the ATM network 160 and the ethernet LANs 16A to 16C have functions similar to those in the first embodiment described above.

In this system of FIG. 17, the connections among the hosts connected with the ethernet LANs 16A to 16C are the bridge interconnections, so that the network layer address (such as the IP address) of these hosts have the same network address (net ID or sub-net ID). Here, the ATM network 160 establishes a group of ATM connections which have the respective bridge devices 161 to 163 as starting points and circulate through the other bridge devices sequentially. For example, for the bridge device 161, the group of ATM connections includes an ATM connection 164-a having the bridge device 161 as a starting point and the bridge device 162 as an ending point and an ATM connection 164-b having the bridge device 162 as a starting point and the bridge device 163 as an ending point. The similar ATM connections 165-a and 165-b, and 166-a and 166-b are provided for the other bridge devices 162 and 163, respectively. The exchanges of the MAC frame among the ethernets 16A to 16C which are bridge interconnected are carried out through these ATM connections.

Now, the function of each of the bridge devices 161 to 163 will be described in detail. Here, all of the bridge devices 161 to 163 have similar configuration and function, so that only a case of the bridge device 161 will be described below as a representative case.

In this fourth embodiment, the bridge device 161 has an internal configuration shown in FIG. 18, which has an ethernet side physical interface unit 171 connected with the ethernet LAN 16A and an ATM network side physical interface unit 178 connected with the ATM network 160. Between them, for handling the data flow from the ethernet side to the ATM network side, there are provided a MAC address referring unit 172, a MAC address filtering unit 173, an ATM-MAC frame formation unit 175, an ATM-MAC frame multiplexing unit 176, and an AAL/ATM layer transmission processing unit 177, and for handling the data flow from the ATM network side to the ethernet side, there are provided an AAL/ATM layer reception processing unit 17A, an ATM-MAC source address referring/discarding unit 17B, an ATM-MAC destination address ethernet side filtering unit 17C, and a MAC frame formation unit 17D.

In addition, an ethernet side MAC address table 174 is provided with respect to the MAC address referring unit 172 and the MAC address filtering unit 173, as well as the ATM-MAC source address referring/discarding unit 17B, where the ATM-MAC destination address ethernet side filtering unit 17C is connected with the ATM-MAC frame multiplexing unit 176, and a cell header value correspondence table 17E is provided with respect to the ATM-MAC frame multiplexing unit 176 and the AAL/ATM layer reception processing unit 17A. Here, the ethernet side physical interface unit 171, the MAC address referring unit 172, the MAC address filtering unit 173, the ethernet side MAC address table 174, and the ATM-MAC frame formation unit 175 have functions similar to the corresponding elements in the first embodiment described above, except that the ethernet side MAC address table 174 is also referred from the ATM-MAC source address referring/discarding unit 17B as well.

First, the function of the bridge device 161 in a case of data flow from the ethernet to the ATM network side in this case will be explained.

The ATM-MAC frame formed by the ATM-MAC frame formation unit 175 is then transmitted to the ATM-MAC frame multiplexing unit 176 which receives the ATM-MAC frames from the ATM-MAC frame formation unit 175 as well as the ATM-MAC destination address ethernet side filtering unit 17C and has a function of multiplexing these ATM-MAC frames and handing the multiplexed ATM-MAC frame to the AAL/ATM layer transmission processing unit 177. At this point, the ATM-MAC multiplexing unit 176 gives the cell header value of the ATM connection having this bridge device as a starting point among the group of ATM connections to the ATM-MAC frame transmitted from the ATM-MAC frame formation unit 175, and the cell header value obtained from the cell header value correspondence table 17E to be described below to the ATM-MAC frame transmitted from the ATM-MAC destination address ethernet side filtering unit 17C.

The AAL/ATM layer transmission processing unit 177 then carries out the ATM cell assembling of the multiplexed ATM-MAC frame received from the ATM-MAC multiplexing unit 176 by attaching the cell header value given by the ATM-MAC frame multiplexing unit 176.

The ATM cell assembled ATM-MAC frame is then transmitted to that ATM connection indicated by the cell header value through the ATM network side physical interface unit 178. Here, as already mentioned, the group of ATM connections are established to circulate the transmitted ATM-MAC frame through all the bridge devices in the ATM network. The establishment or change of these ATM connections can be carried out at a time of the activation or change of the bridge devices.

In this manner, the ATM-MAC frame entered into the ATM network 160 from the bridge device 161 is going to circulate through all the bridge devices by being transferred through the ATM connection 164-a to the bridge device 162, and then after the reception sequence described below, further transferred through the ATM connection 165-b to the bridge device 163.

Next, the function of the bridge device 162 which is a receiving side from a viewpoint of the ATM network 160, i.e., in a case of the data flow from the ATM network to the ethernet side will be explained.

Here, to the receiving side bridge device, as many as [(total number of the bridge devices in the ATM network 160)−1] of the ATM connections having that bridge device as an ending point. To this bridge device, a plurality of ATM cells from all these ATM connections are transmitted by being multiplexed with respect to the same interface, so that there is a need for demultiplexing these ATM cells according to the cell header values by referring the VPI/VCI values.

The ATM cell is received at the ATM network side physical interface unit 178, and after the physical layer processing is applied therein, and the ATM-MAC frame is reproduced at the AAL/ATM layer reception processing unit 13A by applying the ATM cell disassembling processing for each VPI/VCI value, and then handed over to the ATM-MAC source address referring/discarding unit 17B. Also, the cell header value (referred hereafter as the input cell header value) attached to this ATM-MAC frame is handed over to the cell header value correspondence table 17E.

The functions of the ATM-MAC source address referring/discarding unit 17B and the ATM-MAC destination address ethernet side filtering unit 17C are similar to the corresponding elements in the third embodiment described above. Here, however, the ATM-MAC frame transmitted from the ATM-MAC destination address ethernet side filtering unit 17C to the ATM-MAC frame multiplexing unit 176 is accompanied by the output cell header value outputted from the cell header value correspondence table 17E, and this output cell header value is attached to this ATM-MAC frame in the ATM cell assembling of this ATM-MAC frame.

Here, the cell header value correspondence table 17E is a correspondence table of the cell header value for the ATM connection from which the ATM-MAC frame is entering into this bridge device and the cell header value for the ATM connection to which the ATM-MAC frame is to be transmitted from this bridge device, for all the group of ATM connections which have this bridge device as a starting point and circulate through all the other bridges. Thus, in a case this bridge device is an ending point of the group of ATM connections, the output cell header value of "null" is registered in this cell header value correspondence table 17E.

In this manner, the group of ATM connections in this fourth embodiment have the mutual correspondences set up in the cell header value correspondence table 17E of each bridge device, so that as long as the MAC frame can circulate through all the bridge devices, the direction of circulation can be set arbitrarily. By means of this, it becomes possible to set a busy bridge device which is making very frequency exchanges of the MAC frames on an upper stream side in the group of ATM connection such that the transmission of the unnecessary MAC frames in the lower stream side of this busy bridge device can be omitted as they are effectively absorbed at this busy bridge device, and consequently, it becomes possible to reduce the traffic in the ATM network as a whole. In addition, in a case of adding a new bridge device in the bridge interconnections, it is possible to set this new bridge device at the lower stream side of the group of ATM connections, such that the initial setting of the bridge interconnection participation can be made easily. Moreover, it is also possible to dynamically change the order in which the group of ATM connections circulate through the bridge devices according to the size of the traffic between each two bridge devices.

Now, a case in which the broadcast address is used as the destination MAC address of the MAC frame will be described. In this case, for the flow from the ethernet to the ATM network side, it is handled in the same manner as in the third embodiment described above, except that this is done by using the group of ATM connections having this bridge device as a starting point. As for the flow from the ATM network to the ethernet side, the filtering at the ATM-MAC destination address ethernet side filtering unit 17C is not carried out, and it suffices to let this MAC frame to pass through the bridge device to the ethernet side while also relaying this MAC frame to the next bridge device.

By means of the operations described above, it is possible to realize the bridge interconnections among the ethernets 16A to 16C connected to the ATM network 160 in this fourth embodiment.

In summary, according to the first embodiment described above, at a time of transferring the MAC frames between the bridge devices which are bridge interconnected in the ATM network, calf those MAC frames for which the multicast is necessary are transferred through the multicast ATM connections, and the MAC frame for which a target bridge device accommodating a host at its destination MAC address is apparent is transferred through the point-to-point ATM connection connected to that target bridge device and not transferred to the bridge devices other than the target bridge device, so that it becomes possible to reduce the traffic in and out of the bridge device or the traffic in the ATM network.

In addition, in a case the target bridge device accommodating the destination MAC address is apparent, the transfer of the MAC frame can be carried out with the minimum latency (time required for passing) by using the point-to-point ATM connection, unlike a conventional scheme of carrying out the multicast by using the multicast server.

Moreover, in the first embodiment, each bridge device has a table with the MAC address and the ATM cell header value as each entry, and when the source address of the MAC frame received from the ATM network side interface is not registered in this table, this source address and the cell header value for the point-to-point ATM connection connected to the target bridge device of this MAC frame are registered in this table, whereas when the destination address of the MAC frame to be transmitted from the ATM network side interface is registered in this table, this MAC frame is ATM cell assembled by attaching the cell header value registered in this table and transmitted to the ATM network side interface, and when the destination address is either not registered or a broadcast address, this MAC frame is ATM cell assembled by attaching the cell header value for the multicast ATM connection and transmitted to the ATM network side interface, so that the correspondence table for the MAC address information and the cell header information can be produced automatically, and the environment for making the efficient bridge interconnections utilizing the point-to-point ATM connections can be constructed automatically.

Furthermore, by providing a correspondence table of the cell header value of the multicast ATM connection which has this bridge device as a leaf and the cell header value of the point-to-point ATM connection for interconnecting this bridge device with another bridge device which is a root of the multicast ATM connection, it becomes possible to register the cell header value of the point-to-point ATM connection very conveniently by referring to this table at a time of registering the correspondence relationship of the MAC address and the cell header value of the point-to-point ATM connection connected to the bridge device which accommodates the host at that MAC address, even when the MAC frame is received through the multicast ATM connection. As a consequence, even in a case which involves many new table registration operations such as a time of activation of the host, in which the MAC frames arrive through the multicast ATM connection set by the ARP request frame first and the registration and learning of the table content according to these MAC frames are to be carried out many times, the cell header value to be registered is the point-to-point ATM connection connected to the bridge device accommodating the host at each MAC address.

On the other hand, according to the second embodiment described above, the ATM bridge device has a physical interface with respect to the ATM network and directly accommodates the host which emulates the non-ATM LAN through the ATM connection having this bridge device as a starting point, and it is capable of judging whether the MAC frame entered from the physical interface with respect to the ATM network is the MAC frame transmitted from the host which emulates the non-ATM LAN or the MAC frame transmitted from the other bridge device which is bridge interconnected through the ATM network. As a result, the different actions can be taken for the MAC frame transmitted from the host which makes the LAN emulation and the MAC frame transmitted from the other bridge device which is bridge interconnected through the ATM network, and consequently it becomes possible to change the relaying target of the MAC frame according to where it comes from.

Also, the source address of the MAC frame entered from the physical interface with respect to the ATM network is referred, and when the destination address of the MAC frame is a broadcast address and the source address of the MAC frame is the LAN emulation host, this MAC is transferred to all the hosts which make the LAN emulation and which are accommodated by this bridge device as well as all the other bridge devices which are bridge interconnected with this bridge device through the ATM network, and when the source address of the MAC frame is this bridge device, this MAC frame is transferred only to all the hosts which make the LAN emulation and which are accommodated by this bridge device, so that it is possible to prevent the indefinite circulation in the ATM network of the broadcasting MAC frame, i.e., the MAC frame with the broadcast address as the destination MAC address or the MAC frame which should carry out the broadcasting.

Namely, when the broadcasting MAC frame transmitted from the other bridge device in the ATM network is returned to that other bridge device again, if this bridge device is a bridge device which directly accommodates the other LAN emulation host, this bridge device would carry out the similar operation, and this broadcasting MAC frame is going to be indefinitely transferred among the bridge devices which directly accommodate the other LAN emulation hosts. However, by checking the source address of the MAC frame received by the bridge device which directly accommodates the non-ATM LAN emulation host, and transferring this MAC frame only to the LAN emulation host side and not to the other bridge devices when this MAC frame is transmitted from the other bridge devices which are bridge interconnected with this bridge device or when this MAC frame is not for the LAN emulation host directly accommodated by this bridge device, it is possible to prevent the above noted indefinite loop.

In addition, it becomes possible to prevent the indefinite loop for the broadcast frame by means of a simple rule, without requiring a setting of the spanning tree at a root between each two bridge devices.

Also, the source address of the MAC frame entered from the physical interface with respect to the ATM network is referred, and when the source address of this MAC frame is not registered in a table having the MAC addresses and the cell header values as entries, this source address and the cell header value of the ATM connection from which this MAC frame is entered are registered in this table, whereas when the destination address of this MAC frame is registered in this table, this MAC frame is ATM cell assembled by attaching the cell header value registered in this table in correspondence to that destination address and then transmitted to the physical interface with respect to the ATM network, and when the destination address of this MAC frame is not registered in this table, this MAC frame is transferred to all the other bridge devices which are bridge interconnected with this bridge device through the ATM network if the source address of this MAC frame is the LAN emulation host, or this MAC frame is discarded if the source address of this MAC frame is the other bridge device. As a result, the correspondence table of the MAC address information and the cell header information can be produced automatically, and the environment for making the efficient bridge interconnections utilizing the point-to-point ATM connections can be constructed automatically. Moreover, as there is a mechanism for stop relaying the unnecessary MAC frames, it is possible to prevent the indefinite transmission of the MAC frame between the bridge devices when this MAC frame has the destination address which is not registered in this table.

Furthermore, by providing three types of multicast connections including a first multicast connection for interconnecting this bridge device and the emulation hosts directly accommodated by this bridge device, a second multicast connection for interconnecting this bridge device and other bridge devices which are bridge interconnected with this bridge device, and a third multicast connection for interconnecting this bridge device and the other bridge devices which are bridge interconnected with this bridge device as well as the emulation hosts directly accommodated by this bridge device, it becomes possible to realize the distribution of the various types of MAC frames conveniently by using these multicast connections, and it becomes possible to carry out the setting of the table or the setting of the environment in the bridge device conveniently.

More specifically, by providing three types of multicast connections including the multicast connection having this bridge device as a starting point and all the LAN emulation hosts directly accommodated by this bridge device as ending points, the multicast connection having this bridge device as a starting point and all the other bridge devices which are bridge interconnected with this bridge device as ending points, and the multicast connection having this bridge device as a starting point and all the other bridge devices which are bridge interconnected with this bridge device as well as all the LAN emulation hosts directly accommodated by this bridge device as ending points, it becomes possible to realize the distribution of the various types of MAC frames conveniently by using these multicast connections, and it becomes possible to carry out the setting of the table or the setting of the environment in the bridge device conveniently.

It is to be noted that the bridge interconnection of the LAN emulation server in the second embodiment described above are equally applicable to the bridge interconnections in the third and fourth embodiments.

Also, in the first and second embodiments described above, instead of establishing the point-to-point ATM connections among the bridge devices/LE servers in a mesh shape, it is also possible to use a scheme in which one or a plurality of logical spanning trees capable of reaching to all the bridge devices/LE servers is constructed, and each link (edge) of the spanning tree is constructed by the ATM connection, such that each bridge device/LE server which becomes a node of the spanning tree refers to the destination address of the received MAC frame, and reaches to the target (destination) host by tracing the spanning tree.

It is also to be noted that the LAN emulation server described above may be equipped with a multicast server function.

In addition, the ethernet LAN is used in the above description as an exemplary type of LAN to be incorporated in the bridge interconnection/LAN emulation according to the present invention, but the present invention is equally applicable to any other type of LAN such as the token ring, the token pass, the FDDI, etc.

Furthermore, the present invention is not limited to the application in the ATM network, and equally applicable to the virtual connection network such as the frame relay network.

Moreover, the multicast ATM connection may not necessary connect each bridge device with all the other bridge devices as described above, and may be modified to connect each bridge device with a selected number of more than one other bridge devices in the network, if desired.

It is further to be noted that, besides those already mentioned above, many modifications and variations of the above embodiments may be made without departing from the novel and advantageous features of the present inven-

What is claimed is:

1. An ATM bridge device for bridging between a first communication network operated in an ATM scheme and a second communication network operated in a non-ATM scheme, comprising:

a first interface for exchanging signals with the first communication network;

a second interface for exchanging signals with the second communication network;

first transmission means for judging whether a host having a destination address of a MAC frame entered from the second interface exists in the second communication network, transmitting the MAC frame entered from the second interface to the first interface when it is judged that the host having the destination address of the MAC frame entered from the second interface does not exist in the second communication network, and transmitting a MAC frame to be transmitted from the first interface selectively to one of a point-to-point ATM connection interconnecting said ATM bridge device and another ATM bridge device and a multicast ATM connection interconnecting said ATM bridge device and other ATM bridge devices;

second transmission means for transmitting a MAC frame entered from the first interface to the second interface;

table means for storing MAC addresses and identifiers of point-to-point ATM connections related to the stored MAC addresses by registering a source address of each MAC frame entered from the first interface and an identifier of a point-to-point ATM connection corresponding to said each MAC frame; and a correspondence table of (a) an identifier of the multicast ATM connection which has said ATM bridge device as a leaf, and (b) an identifier of the point-to-point ATM connection interconnecting said ATM bridge device and another ATM bridge device which is a root of the multicast ATM connection.

2. The ATM bridge device of claim 1, wherein the second transmission means judges whether a host having a destination address of the MAC frame entered from the first interface exists in the first communication network, and transmits the MAC frame entered from the first interface to the second interface when it is judged that the host having the destination address of the MAC frame entered from the first interface does not exist in the first communication network.

3. The ATM bridge device of claim 2, wherein the second transmission means judges whether the host having the destination address of the MAC frame entered from the first interface exists in the first communication network by referring to the MAC addresses stored in the table means.

4. The ATM bridge device of claim 1, wherein the first transmission means selectively transmits the MAC frame transmitted from the first interface by referring to the table means, such that the MAC frame transmitted from the first interface is transmitted to the point-to-point ATM connection when a destination address of the MAC frame to be transmitted from the first interface is registered as one of the MAC addresses in the table means, and the MAC frame transmitted from the first interface is transmitted to the multicast ATM connection when the destination address of the MAC frame to be transmitted from the first interface is not registered as one of the MAC addresses in the table means.

5. The ATM bridge device of claim 1, wherein when the MAC frame entered from the first interface arrives from a certain point-to-point ATM connection, the table means registers an identifier of said certain point-to-point ATM connection in correspondence to the source address of the MAC frame entered from the first interface in the table means, whereas when the MAC frame entered from the first interface arrives from a certain multicast ATM connection, the table means registers an identifier of one point-to-point ATM connection estimated as interconnecting said ATM bridge device and another ATM bridge device at a root of said certain multicast ATM connection.

6. The ATM bridge device of claim 1, further comprising:

means for registering the source address of each MAC frame and an identifier of a point-to-point ATM connection connected to an ATM bridge device which is a transfer target of each MAC frame into the table means when the source address of each MAC frame received from the first interface is not registered in the table means yet.

7. The ATM bridge device of claim I, wherein when a destination address of the MAC frame to be transmitted from the first interface is registered as one of the MAC addresses in the table means, the first transmission means transmits the MAC frame to be transmitted from the first interface to the first interface by attaching an identifier registered in the table means in correspondence to said one of the MAC addresses, whereas when the destination address of the MAC frame to be transmitted from the first interface is not registered as one of the MAC addresses in the table means and the destination address of the MAC frame to be transmitted from the first interface is a broadcast address, the first transmission means transmits the MAC frame to be transmitted from the first interface to the first interface by attaching an identifier for the multicast ATM connection.

8. An ATM bridge device for an ATM communication network, which is directly accommodating emulation hosts for emulating another non-ATM communication network through ATM connections for bridge interconnecting said ATM bridge device and other ATM bridge devices, comprising:

an interface for exchanging signals with the ATM communication network; and transmission means for identifying a type of a MAC frame entered from the interface as one of a first type MAC frame which is transmitted from any of the emulation hosts and a second type MAC frame which is transmitted from another ATM bridge device which is bridge interconnected with said ATM bridge device through the ATM communication network, and transmitting the MAC frame entered from the interface selectively to ATM connections of the ATM communication network according to the identified type.

9. The ATM bridge device of claim 8, wherein the transmission means includes:

means for retrieving a source address of the MAC frame entered from the interface;

means for transmitting the MAC frame entered from the interface to the emulation hosts accommodated by said ATM bridge device and the other ATM bridge devices which are bridge interconnected with said ATM bridge device through the ATM communication network when a destination address of the MAC frame entered from the interface is a broadcast address and the source address of the MAC frame entered from the interface is one of the emulation hosts; and means for transmitting the MAC frame entered from the interface to the emulation hosts accommodated by said ATM bridge device alone when the source address of the MAC frame entered from the interface is the another ATM bridge device.

10. The ATM bridge device of claim 8, wherein the transmission means includes:

means for retrieving a source address of the MAC frame entered from the interface;

table means for storing MAC addresses and identifiers of ATM connections related to the stored MAC addresses;

means for registering in the table means the source address of the MAC frame entered from the interface and an identifier of an ATM connection which transmitted the MAC frame entered from the interface, when the source address of the MAC frame entered from the interface is not registered in the table means yet;

means for transmitting the MAC frame entered from the interface to the interface when a destination address of the MAC frame entered from the interface is registered as one of the MAC addresses in the table means, by attaching an identifier registered in the table means in correspondence to said one of the MAC addresses; and means for transferring the MAC frame entered from the interface to other ATM bridge devices which are bridge interconnected with said ATM bridge device through the ATM communication network when the destination address of the MAC frame entered from the interface is not registered in the table means yet and the source address of the MAC frame entered from the interface is one of the emulation hosts, and discarding the MAC frame entered from the interface when the source address of the MAC frame entered from the interface is another ATM bridge device.

11. The ATM bridge device of claim 8, wherein said ATM bridge device is provided with a first multicast connection for interconnecting said ATM bridge device and the emulation hosts directly accommodated by said ATM bridge device, a second multicast connection for interconnecting said ATM bridge device and other ATM bridge devices which are bridge interconnected with said ATM bridge device, and a third multicast connection for interconnecting said ATM bridge device and the other ATM bridge devices which are bridge interconnected with said ATM bridge device as well as the emulation hosts directly accommodated by said ATM bridge device.

12. A method for bridging between a first communication network operated in an ATM scheme and a second communication network operated in a non-ATM scheme, comprising the steps of:

(a) providing a first interface for exchanging signals with the first communication network and a second interface for exchanging signals with the second communication network in an ATM bridge device between the first and second communication networks;

(b) judging whether a host having a destination address of a MAC frame entered from the second interface exists in the second communication network, and transmitting the MAC frame entered from the second interface to the first interface when it is judged that the host having the destination address of the MAC frame entered from the second interface does not exist in the second communication network;

(c) transmitting a MAC frame to be transmitted from the first interface selectively to one of a point-to-point ATM connection interconnecting said ATM bridge device and another ATM bridge device and a multicast ATM connection interconnecting said ATM bridge device and other ATM bridge devices;

(d) transmitting a MAC frame entered from the first interface to the second interface;

(e) storing MAC addresses and identifiers of point-to-point ATM connections related to the stored MAC addresses in table means by registering a source address of each MAC frame entered from the first interface and an identifier of a point-to-point ATM connection corresponding to said each MAC frame; and (f) providing a correspondence table of (i) an identifier of the multicast ATM connection which has said ATM bridge device as a leaf, and (ii) an identifier of the point-to-point ATM connection interconnecting said ATM bridge device and another ATM bridge device which is a root of the multicast ATM connection.

13. The method of claim 12, wherein at the step (d), whether a host having a destination address of the MAC frame entered from the first interface exists in the first communication network is judged, and the MAC frame entered from the first interface is transmitted to the second interface when it is judged that the host having the destination address of the MAC frame entered from the first interface does not exist in the first communication network.

14. The method of claim 13, wherein at the step (d), whether the host having the destination address of the MAC frame entered from the first interface exists in the first communication network is judged by referring to the MAC addresses stored in the table means.

15. The method of claim 12, wherein at the step (c), the MAC frame transmitted from the first interface is selectively transmitted by referring to the table means, such that the MAC frame transmitted from the first interface is transmitted to the point-to-point ATM connection when a destination address of the MAC frame to be transmitted from the first interface is registered as one of the MAC addresses in the table means, and the MAC frame transmitted from the first interface is transmitted to the multicast ATM connection when the destination address of the MAC frame to be transmitted from the first interface is not registered as one of the MAC addresses in the table means.

16. The method of claim 12, wherein at the step (e), when the MAC frame entered from the first interface arrives from a certain point-to-point ATM connection, the table means registers an identifier of said certain point-to-point ATM connection in correspondence to the source address of the MAC frame entered from the first interface in the table means, whereas when the MAC frame entered from the first interface arrives from a certain multicast ATM connection, the table means registers an identifier of one point-to-point ATM connection estimated as interconnecting said ATM bridge device and another ATM bridge device at a root of said certain multicast ATM connection.

17. The method of claim 12, further comprises the step of:

(g) registering the source address of each MAC frame and an identifier of a point-to-point ATM connection connected to an ATM bridge device which is a transfer target of each MAC frame into the table means when the source address of each MAC frame received from the first interface is not registered in the table means yet.

18. The method of claim 12, wherein at the step (c), when a destination address of the MAC frame to be transmitted from the first interface is registered as one of the MAC addresses in the table means, the MAC frame to be transmitted from the first interface is transmitted to the first interface by attaching an identifier registered in the table means in correspondence to said one of the MAC addresses, whereas when the destination address of the MAC frame to be transmitted from the first interface is not registered as one of the MAC addresses in the table means and the destination address of the MAC frame to be transmitted from the first interface is a broadcast address, the MAC frame to be transmitted from the first interface is transmitted to the first interface by attaching an identifier for the multicast ATM connection.

19. A method of bridging for an ATM communication network by an ATM bridge device which is directly accommodating emulation hosts for emulating another non-ATM communication network through ATM connections for bridge interconnecting said ATM bridge device and other ATM bridge devices, comprising the steps of:

(a) providing an interface for exchanging signals with the ATM communication network in said ATM bridge device; and (b) identifying a type of a MAC frame entered from the interface as one of a first type MAC frame which is transmitted from any of the emulation hosts and a second type MAC frame which is transmitted from another ATM bridge device which is bridge interconnected with said ATM bridge device through the ATM communication network, and transmitting the MAC frame entered from the interface selectively to ATM connections of the ATM communication network according to the identified type.

20. The method of claim 19, wherein the step (b) includes the steps of:

(b1-1) referring a source address of the MAC frame entered from the interface;

(b1-2) transmitting the MAC frame entered from the interface to the emulation hosts accommodated by said ATM bridge device and other ATM bridge devices bridge interconnected with said ATM bridge device through the ATM communication network when a destination address of the MAC frame entered from the interface is a broadcast address and the source address of the MAC frame entered from the interface is one of the emulation hosts; and (b1-3) transmitting the MAC frame entered from the interface to the emulation hosts accommodated by said ATM bridge device alone when the source address of the MAC frame entered from the interface is another ATM bridge device.

21. The method of claim 19, wherein the step (b) includes the steps of:

(b2-1) retrieving a source address of the MAC frame entered from the interface;

(b2-2) providing table means for storing MAC addresses and identifiers of ATM connections in correspondences;

(b2-3) registering into the table means the source address of the MAC frame entered from the interface and an identifier of an ATM connection which transmitted the MAC frame entered from the interface, when the source address of the MAC frame entered from the interface is not registered in the table means yet;

(b2-4) transmitting the MAC frame entered from the interface to the interface when a destination address of the MAC frame entered from the interface is registered as one of the MAC addresses in the table means, by attaching an identifier registered in the table means in correspondence to said one of the MAC addresses; and (B2-5) transferring the MAC frame entered from the interface to other ATM bridge devices which are bridge interconnected with said ATM bridge device through the ATM communication network when the destination address of the MAC frame entered from the interface is not registered in the table means yet and the source address of the MAC frame entered from the interface is one of the emulation hosts, and discarding the MAC frame entered from the interface when the source address of the MAC frame entered from the interface is another ATM bridge device.

22. The method of claim 19, further comprising the step of (d) providing said ATM bridge device with a first multicast connection for interconnecting said ATM bridge device and the emulation hosts directly accommodated by said ATM bridge device, a second multicast-connection for interconnecting sand ATM bridge device and other ATM bridge devices which are bridge interconnected with said ATM bridge device, and a third multicast connection for interconnecting said ATM bridge device and the other ATM bridge devices which are bridge interconnected with said ATM bridge device as well as the emulation hosts directly accommodated by said ATM bridge device.

* * * * *